(12) United States Patent
Wester et al.

(10) Patent No.: US 11,627,039 B2
(45) Date of Patent: Apr. 11, 2023

(54) SITE MANAGEMENT IN AN ON-DEMAND SYSTEM

(71) Applicant: salesforce.com, Inc., San Francisco, CA (US)

(72) Inventors: Gregory Wester, San Francisco, CA (US); Matthew Paiz, San Francisco, CA (US); Aleksandr Shulman, San Francisco, CA (US)

(73) Assignee: salesforce.com, inc.

( * ) Notice: Subject to any disclaimer, the term of this patent is extended or adjusted under 35 U.S.C. 154(b) by 198 days.

(21) Appl. No.: 16/947,814

(22) Filed: Aug. 18, 2020

(65) Prior Publication Data
US 2020/0381939 A1 Dec. 3, 2020

Related U.S. Application Data

(63) Continuation of application No. 16/385,721, filed on Apr. 16, 2019, now Pat. No. 11,283,292, which is a
(Continued)

(51) Int. Cl.
*H04L 41/0803* (2022.01)
*G05F 5/00* (2006.01)
(Continued)

(52) U.S. Cl.
CPC .......... *H04L 41/0803* (2013.01); *F24F 11/30* (2018.01); *F24F 11/46* (2018.01);
(Continued)

(58) Field of Classification Search
CPC .. G06F 3/0481; G06F 3/04815; G06F 3/0482; G06F 3/04847; G06F 5/00;
(Continued)

(56) References Cited

U.S. PATENT DOCUMENTS 5,241,257 A * 8/1993 Nordby .................. D06F 34/08
318/807
5,577,188 A 11/1996 Zhu
(Continued)

FOREIGN PATENT DOCUMENTS

| JP | 05217091 A | 2/1992 |
| JP | 06149825 A | 5/1994 |
| JP | 2006353005 A | 12/2006 |

OTHER PUBLICATIONS

United States Patent and Trademark Office, Office Action received in U.S. Appl. No. 16/385,721, dated Dec. 30, 2020.

*Primary Examiner* — Crystal J Barnes-Bullock
(74) *Attorney, Agent, or Firm* — LKGlobal | Lorenz & Kopf, LLP

(57) ABSTRACT

Methods and systems are provided for managing environmental conditions and energy usage associated with a site. One exemplary method of regulating an environment condition at a site involves a server receiving environmental measurement data from a monitoring system at the site via a network, determining an action for an electrical appliance at the site based at least in part on the environmental measurement data and one or more monitoring rules associated with the site, and providing an indication of the action to an actuator for the electrical appliance.

20 Claims, 8 Drawing Sheets

Related U.S. Application Data continuation of application No. 15/187,217, filed on Jun. 20, 2016, now Pat. No. 10,305,323, which is a continuation of application No. 13/739,445, filed on Jan. 11, 2013, now Pat. No. 9,397,521.

(60) Provisional application No. 61/589,178, filed on Jan. 20, 2012.

(51) Int. Cl.
| | |
|---|---|
| *G06F 16/951* | (2019.01) |
| *G06F 16/903* | (2019.01) |
| *G05B 15/02* | (2006.01) |
| *F24F 11/30* | (2018.01) |
| *F24F 11/58* | (2018.01) |
| *F24F 11/46* | (2018.01) |
| *H02J 13/00* | (2006.01) |
| *H04L 12/28* | (2006.01) |
| *F24F 11/80* | (2018.01) |
| *F24F 11/523* | (2018.01) |
| *F24F 11/63* | (2018.01) |
| *F24D 19/10* | (2006.01) |
| *F24F 110/10* | (2018.01) |
| *F24F 110/20* | (2018.01) |

(52) U.S. Cl.
CPC ............ *F24F 11/523* (2018.01); *F24F 11/58* (2018.01); *F24F 11/63* (2018.01); *F24F 11/80* (2018.01); *G05B 15/02* (2013.01); *G05F 5/00* (2013.01); *G06F 16/90335* (2019.01); *G06F 16/951* (2019.01); *H02J 13/00* (2013.01); *H02J 13/00006* (2020.01); *H02J 13/00007* (2020.01); *H04L 12/28* (2013.01); *H04L 12/2816* (2013.01); *F24D 19/10* (2013.01); *F24F 2110/10* (2018.01); *F24F 2110/20* (2018.01); *G05B 2219/25011* (2013.01); *G05B 2219/25329* (2013.01); *G05B 2219/2639* (2013.01); *G05B 2219/31093* (2013.01); *H02J 2310/14* (2020.01); *Y02P 80/10* (2015.11); *Y04S 20/20* (2013.01); *Y04S 40/12* (2013.01)

(58) Field of Classification Search
CPC . G06F 16/90335; G06F 16/951; G05B 13/02; G05B 15/02; G05B 2219/25011; G05B 2219/25329; G05B 2219/2639; G05B 2219/31093; G06Q 50/06; H02J 2310/14; H04J 13/0017; H04J 13/00006; H04J 13/00007; H04L 12/2816; H04L 41/0803
See application file for complete search history.

(56) References Cited

U.S. PATENT DOCUMENTS

| | | | |
|---|---|---|---|
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,088,688 A | 7/2000 | Crooks et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,873,345 B2 | 3/2005 | Fukuda et al. | |
| 7,016,761 B2 | 3/2006 | Hsiao et al. | |
| 7,062,502 B1 | 6/2006 | Kesler | |
| 7,069,231 B1 | 6/2006 | Cinarkaya et al. | |
| 7,181,758 B1 | 2/2007 | Chan | |
| 7,206,646 B2 * | 4/2007 | Nixon | G05B 23/0272 702/182 |
| 7,289,976 B2 | 10/2007 | Kihneman et al. | |
| 7,295,119 B2 * | 11/2007 | Rappaport | H04L 43/00 705/28 |
| 7,295,960 B2 * | 11/2007 | Rappaport | H04W 16/20 703/2 |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,620,655 B2 | 11/2009 | Larsson et al. | |
| 7,698,160 B2 | 4/2010 | Beaven et al. | |
| 7,730,478 B2 | 6/2010 | Weissman | |
| 7,739,216 B2 | 6/2010 | Gomer et al. | |
| 7,779,475 B2 | 8/2010 | Jakobson et al. | |
| 8,014,943 B2 | 9/2011 | Jakobson | |
| 8,015,495 B2 | 9/2011 | Achacoso et al. | |
| 8,019,697 B2 | 9/2011 | Ozog | |
| 8,032,297 B2 | 10/2011 | Jakobson | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,209,308 B2 | 6/2012 | Rueben et al. | |
| 8,235,921 B2 | 8/2012 | Avni et al. | |

(56) References Cited

U.S. PATENT DOCUMENTS

| | | |
|---|---|---|
| 8,250,017 B2 | 8/2012 | Babu et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,047 B2 | 10/2013 | Fecteau et al. |
| 8,566,301 B2 | 10/2013 | Rueben et al. |
| 8,646,103 B2 | 2/2014 | Jakobson et al. |
| 8,676,388 B2 | 3/2014 | Dodderi et al. |
| 8,676,394 B2 | 3/2014 | Lo et al. |
| 8,868,218 B2 | 10/2014 | Park et al. |
| 8,897,835 B2 * | 11/2014 | Yuen .................. G01C 22/00 455/556.1 |
| 8,914,504 B2 * | 12/2014 | Grelewicz ............. G06F 9/44 709/224 |
| 8,918,221 B2 | 12/2014 | Le Roux et al. |
| 9,106,099 B2 | 8/2015 | Gelonese |
| 9,121,726 B2 | 9/2015 | Comen |
| 9,141,708 B2 | 9/2015 | Hungar et al. |
| 9,361,008 B2 * | 6/2016 | Kling ................. G06F 1/3234 |
| 9,448,544 B2 * | 9/2016 | Slessman .......... H05K 7/20745 |
| 9,589,241 B2 | 3/2017 | Brown et al. |
| 9,709,965 B2 * | 7/2017 | Slessman ............ G06F 9/5094 |
| 10,054,972 B2 | 8/2018 | Le Roux et al. |
| 10,254,720 B2 * | 4/2019 | Slessman ............. G05B 13/02 |
| 10,620,598 B2 * | 4/2020 | Halabieh ............ G06Q 50/04 |
| 11,012,320 B2 * | 5/2021 | Mortsolf ........... G06F 3/04815 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0143467 A1 | 7/2004 | McAllister et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2006/0285436 A1 | 12/2006 | Bastardo et al. |
| 2008/0071640 A1 | 3/2008 | Nguyen |
| 2008/0249972 A1 | 10/2008 | Dillon |
| 2009/0044129 A1 * | 2/2009 | Ebrom .................. H04L 69/26 715/738 |
| 2009/0063414 A1 | 3/2009 | White et al. |
| 2009/0100342 A1 | 4/2009 | Jakobson |
| 2009/0157835 A1 | 6/2009 | Thompson et al. |
| 2009/0177744 A1 | 7/2009 | Marlow et al. |
| 2010/0008256 A1 | 1/2010 | Chebbo et al. |
| 2010/0262313 A1 * | 10/2010 | Chambers ............ G06Q 10/04 700/295 |
| 2010/0292861 A1 | 11/2010 | Tsai et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0159454 A1 | 6/2013 | Hunter et al. |
| 2013/0204409 A1 | 8/2013 | Shin |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0285839 A1 | 10/2013 | Comen |
| 2013/0307702 A1 | 11/2013 | Pal et al. |
| 2015/0120075 A1 | 4/2015 | Le Roux et al. |
| 2015/0154618 A1 | 6/2015 | Forbes et al. |
| 2019/0079996 A1 * | 3/2019 | Mochel ............... G06F 16/168 |
| 2020/0074865 A1 * | 3/2020 | Chu .................... G06Q 10/047 |
| 2020/0175534 A1 | 6/2020 | Aggarwala et al. |
| 2022/0019638 A1 * | 1/2022 | Stephenson ....... G06F 16/90335 |

* cited by examiner

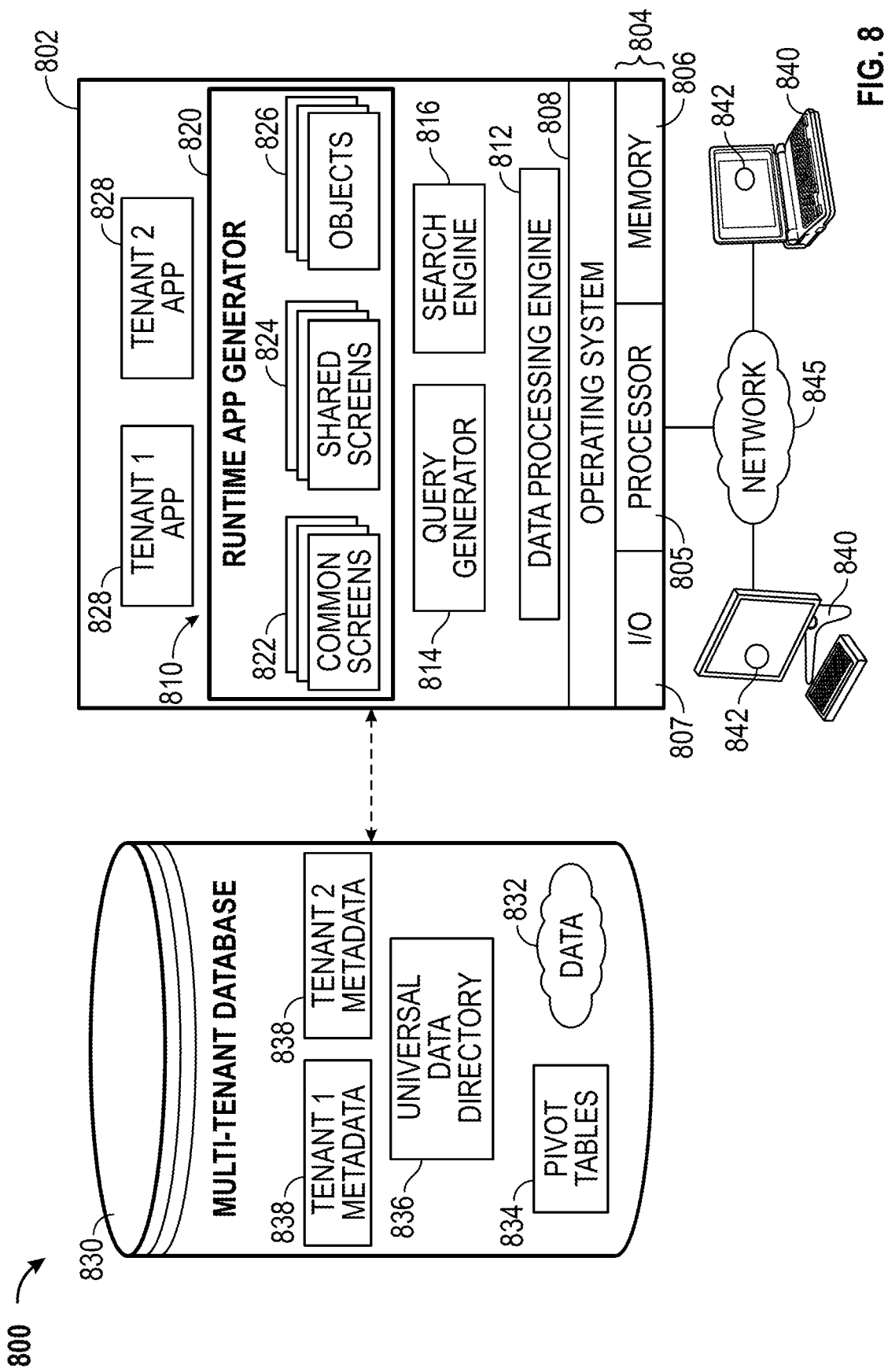

SITE MANAGEMENT IN AN ON-DEMAND SYSTEM

CROSS-REFERENCE TO RELATED APPLICATION(S)

This application is a continuation of U.S. patent application Ser. No. 16/385,721, filed Apr. 16, 2019, which claims the benefit of U.S. patent application Ser. No. 15/187,217, filed Jun. 20, 2016, which claims the benefit of U.S. patent application Ser. No. 13/739,445, filed Jan. 11, 2013, which claims the benefit of U.S. provisional patent application Ser. No. 61/589,178, filed Jan. 20, 2012, the entire contents of which are incorporated by reference herein.

TECHNICAL FIELD

Embodiments of the subject matter described herein relate generally to computer systems, and more particularly, embodiments of the subject matter relate to methods and systems for monitoring and regulating environmental conditions and the corresponding energy usage at a site using an on-demand system.

BACKGROUND

Rising energy costs and the depletion of natural resources have motivated individuals and organizations to use energy more efficiently. Accordingly, utility companies have developed and deployed improved means for monitoring energy usage (e.g., smart meters or the like) and/or providing better feedback to users with the goal of facilitating more efficient energy consumption. However, in many existing systems, monitoring energy usage at a particular location, determining how electrical appliances at that location should be operated based on the energy usage, and effectuating that operation of those electrical appliances in real-time still requires a relatively high level of manual intervention that has prevented widespread real-time energy management.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 8 is a block diagram of an exemplary multi-tenant system suitable for integration with in the on-demand energy management system of FIG. 1 in accordance with one or more embodiments.

DETAILED DESCRIPTION

Figure 1:
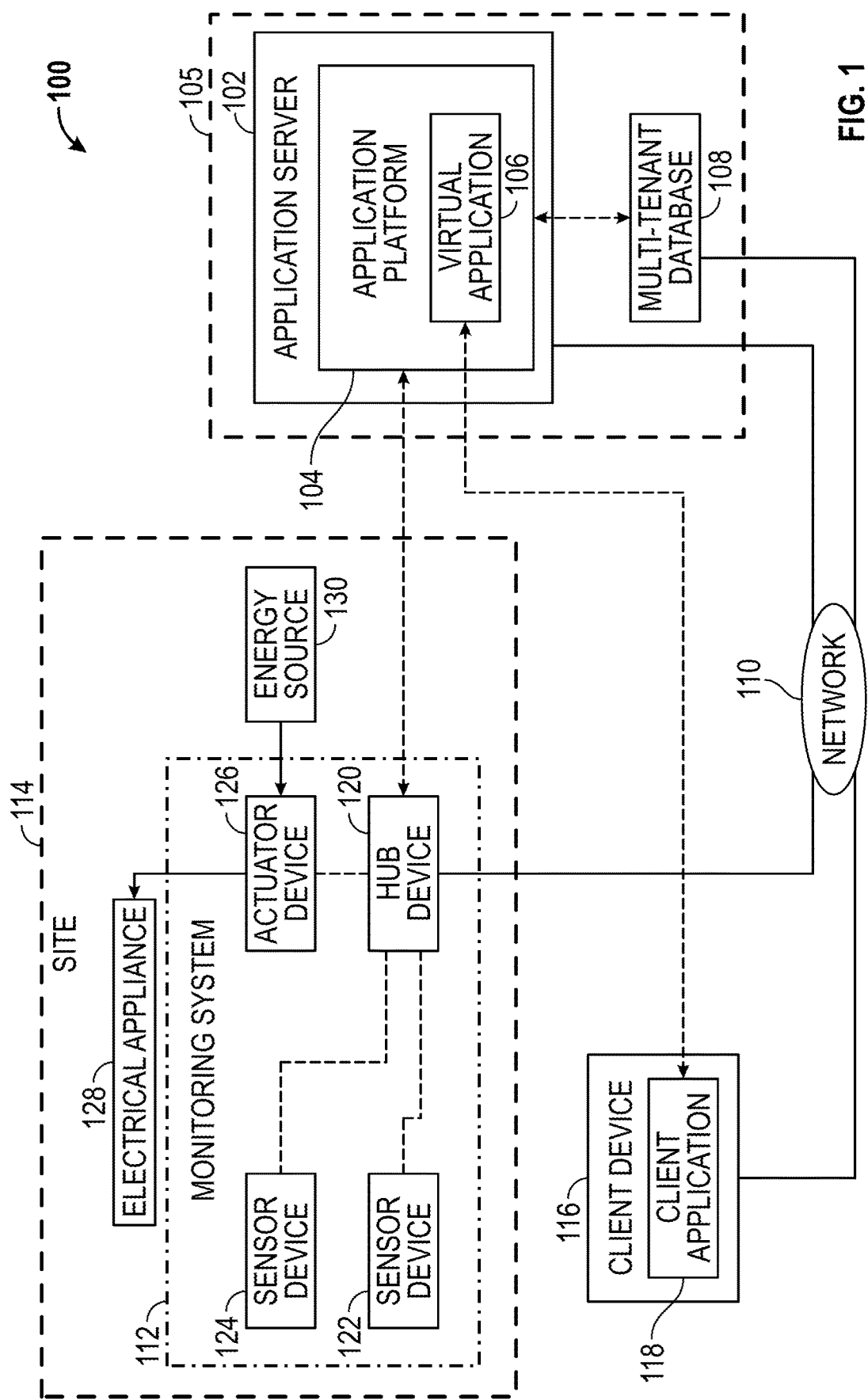
FIG. 1 is a block diagram of an exemplary on-demand energy management system.

Embodiments of the subject matter described herein generally relate to managing, regulating, or otherwise controlling environmental conditions and corresponding energy consumption at a site in a substantially autonomous manner with little or no manual intervention. As described in greater detail below in the context of FIGS. 1-5, in exemplary embodiments, a tenant supported by the on-demand application platform may establish an association with a site to be managed and define one or more monitoring rules for governing the environmental conditions and/or energy consumption at the site. In exemplary embodiments, sensor devices deployed at the site automatically initiate communications with the on-demand application platform upon deployment, thereby allowing the on-demand application platform to establish an association between the site (and thereby the tenant) based on the position (e.g., location and/or altitude) of the sensor devices and provide, to the sensor devices, information used by the sensor devices to automatically configure themselves for operation in accordance with the monitoring rules for the site. Thereafter, the sensor devices operate autonomously in accordance with the information provided by the on-demand application platform to sense, detect, or otherwise measure environmental conditions at the site and provide the environmental measurement data to the on-demand application platform, wherein the on-demand application platform compares the received environmental measurement data to the monitoring rules for the site to determine what, if any, actions need to be taken to modify environmental conditions at the site.

When the on-demand application platform determines an action should be undertaken to modify an environmental condition at the site, the on-demand application platform signals or otherwise indicates the action to an actuator for an electrical appliance at the site that influences that environmental condition. The actuator, in turn, automatically operates the electrical appliance to consume energy (or alternatively, cease consuming energy) and thereby influence the environmental condition at the site. In this manner, environmental conditions at the site may be monitored and adjusted without manual interaction. In exemplary embodiments, the on-demand application platform stores or otherwise maintains the environmental measurement data for the site along with information pertaining to the status of the environmental appliances at the site in association with the site's tenant in a multi-tenant database, thereby allowing the on-demand application platform to generate or otherwise provide graphical user interface (GUI) displays depicting the environmental conditions at the site and/or the state of the electrical appliances at the site to a user associated with that tenant.

In exemplary embodiments, the sensor devices communicate with the on-demand application platform via a hub device deployed at the site, which establishes a wireless mesh network for transmitting data to and/or receiving data from the individual sensor devices. The hub device includes a network interface used to communicatively couple the hub device directly to another network (e.g., different than the wireless mesh network) that the on-demand application platform is also communicatively coupled to. As described in greater detail below in the context of FIGS. 6-7, in exemplary embodiments, upon deployment at the site, the hub device automatically initiates communications with the on-demand application platform and requests communication configuration information for subsequent communications with the on-demand application platform, such as, for example, a frequency (or rate) at which the hub device should upload environmental measurement data from the sensor devices to the on-demand application platform. In some embodiments, the on-demand application platform determines the communication configuration information based on the monitoring rules for the site or other rules, privileges, permissions, or the like associated with the site's tenant. The hub device automatically configures itself for subsequent operation in accordance with the received communication configuration information, and thereafter, the hub device autonomously batches environmental measurement data received from the sensor devices via the wireless mesh networks and transmits or otherwise provides the batched environmental measurement data to the on-demand application platform via the other network with the desired upload frequency.

Turning now to FIG. 1, an exemplary on-demand energy management system 100 includes an application server 102 that includes or otherwise implements an application platform 104 capable of generating instances of virtual applications 106 at run-time (or "on-demand") based upon data stored or otherwise maintained by a database 108 that is communicatively coupled to the application server 102, for example, via a communications network 110, such as a wired and/or wireless computer network, a cellular network, a mobile broadband network, a radio network, or the like. The on-demand application platform 104 communicates with an environment monitoring system 112 located at a site 114 via the network 110 to receive measurements for one or more environmental conditions at the site 114 and regulate or otherwise manage those environmental conditions at the site 114, as described in greater detail below. In exemplary embodiments, the application platform 104 provides an instance of the virtual application 106 to a client device 116 via the network 110 and generates one or more GUI displays based on the environmental measurement data received from the monitoring system 112. The GUI displays are integrated into the virtual application 106 provided to the client device 116 to present a graphical representation of the environmental conditions at the site 114 to a user associated with the tenant associated with the site 114.

In the illustrated embodiment, the site 114 generally represents a physically distinct region that is associated with or otherwise corresponds to a tenant (e.g., a business, organization, or another entity) supported by the on-demand application platform 104 and/or database 108, such as, for example, a building (or a portion thereof), a venue, a place of business, a factory, or another facility or point of interest. In accordance with one or more embodiments, the site 114 has a fixed position and information pertaining to the position of the site 114 (e.g., the latitude and longitude of the site 114 and/or the altitude of the site 114) is stored or otherwise maintained by the database 108 in association with its tenant, as described in greater detail below.

In exemplary embodiments, the monitoring system 112 includes a plurality of devices 120, 122, 124, 126 that are located at the site 114 or are otherwise positioned within the confines of the site 114. The illustrated monitoring system 112 includes a first device 120 that is communicatively coupled to the network 110 and functions as a router or communications hub that facilitates communications between the remaining devices 122, 124, 126 of the monitoring system 112 and the application server 102 and/or application platform 104 via the network 110. Accordingly, for convenience, device 120 may alternatively be referred to herein as the hub device. As described below, the hub device 120 creates, establishes, or otherwise provides a wireless mesh network which is utilized to communicatively couple the remaining devices 122, 124, 126 to the hub device 120, and thereby, the network 110. For example, the devices 120, 122, 124, 126 may be communicatively coupled over a wireless mesh network in accordance with the ZigBee protocol, the IEEE 802.15 protocol, or a variant thereof. In this manner, the remaining devices 122, 124, 126 at the site 114 are indirectly coupled to the network 110 via the hub device 120. In accordance with one or more embodiments, each device 120, 122, 124, 126 includes a global positioning system (GPS) receiver or another suitable means for determining its own position and automatically transmits or otherwise provides its location to the application platform 104 upon that device 120, 122, 124, 126 being installed, enabled, powered on, or otherwise initialized at the site 114, wherein the application platform 104 utilizes the received position of a respective device 120, 122, 124, 126 to establish an association between the respective device 120, 122, 124, 126 and the site 114 and/or site tenant, as described in greater detail below. In alternative embodiments, the application platform 104 may utilize the location of the hub device 120 on the network 110 to establish an association between the respective device 120, 122, 124, 126 communicating via the hub device 120 and the site 114 and/or site tenant associated with the hub device 120. In yet other embodiments, the user may manually establish the association by manually defining the position of the respective device 120, 122, 124, 126 within the site 114 (e.g., conference room, kitchen, bathroom, living room, etc.), for example, when the device 120, 122, 124, 126 will have a fixed location at the site 114.

Still referring to FIG. 1, in exemplary embodiments, the monitoring system 112 includes one or more sensor devices 122, 124, wherein each respective sensor device 122, 124 includes one or more auxiliary sensing elements adapted to sense, detect, or otherwise measure one or more environmental conditions at the site 114 in the vicinity of that respective sensor device 122, 124. In this regard, an environmental condition is a quantifiable characteristic of the ambient environment proximate a respective sensor device 122, 124, such as, for example, temperature, humidity, luminance, motion, vibration, an electromagnetic characteristic (e.g., an electric and/or magnetic field), or the like. Accordingly, the auxiliary sensing elements associated with a respective sensor device 122, 124 may be realized as one or more of the following: a light (or luminance) sensing element (e.g., a photosensor or photodetector), a temperature sensing element (e.g., a thermometer), a humidity sensing element (e.g., a hygrometer), a magnetic sensing element (e.g., a magnometer), a motion sensing element (or motion detector), and/or a tilt sensor (e.g., an accelerometer, a gyroscope or the like). After quantifying or otherwise obtaining measurements for the environmental condition(s) in its vicinity, each sensor device 122, 124 transmits, communicates, or otherwise provides the obtained environmental measurement data to the hub device 120, which, in turn, transmits, communicates, or otherwise provides the environmental measurement data for the site 114 to the application server 102 and/or application platform 104 via the network 110. In exemplary embodiments, the hub device 120 temporarily stores, caches, buffers or otherwise batches the environmental measurement data received from the various sensor devices 122, 124 before transmission, so that the hub device 120 transmits environmental measurement data from multiple sensor devices 122, 124 across the site 114 to the application server 102 and/or application platform 104 at a single instance in time. In this manner, environmental measurement data from individual sensor devices 122, 124 may not be continuously and/or asynchronously sent to the application server 102 and/or application platform 104. The hub device 120 may maintain an association between received environmental measurement data and its corresponding sensor device 122, 124 and provide indication of the association to the application platform 104, so that the application platform 104 may determine or otherwise identify the locations within the site 114 the environmental measurement data corresponds to.

In the illustrated embodiment, the monitoring system 112 also includes an actuator device 126 coupled to an electrical appliance 128 at the site 114, and the electrical appliance 128 is capable of influencing, changing, modifying or otherwise adjusting one or more environmental conditions at or within the vicinity of the electrical appliance 128. For example, the electrical appliance 128 may be realized as a heating element (e.g., a heater or heating system, or the like), a ventilation element (e.g., a fan or the like), a cooling element (e.g., an air conditioner or air conditioning system, or the like), a lighting element (e.g., a lamp, a light bulb, or the like), a humidity regulating element (e.g., a humidifier, a dehumidifier, or the like), or another suitable device capable of influencing an environmental condition at the site 114. The actuator device 126 includes or is otherwise coupled to an actuating element that controls operation of the electrical appliance 128, and thereby regulates or otherwise controls the consumption of energy (or power), by the electrical appliance 128, from an energy source 130 associated with the site 114. For example, the energy source 130 may be realized as the mains electrical system (or grid power) at the site 114 and the actuator device 126 may include a relay that is coupled between the electrical appliance 128 and the energy source 130 to thereby control whether electrical energy from the grid is provided to the electrical appliance 128. As described in greater detail below, in exemplary embodiments, the hub device 120 receives, from the application server 102 and/or application platform 104 via the network 110, signals, commands, instructions, or another indication of how or whether the electrical appliance 128 should be operated. In turn, the hub device 120 signals, commands, or otherwise instructs the actuator device 126, via the wireless mesh network, to activate and/or deactivate its associated actuating element and thereby operate the electrical appliance 128 in the manner indicated by the application server 102 and/or application platform 104.

Still referring to FIG. 1, in exemplary embodiments, the database 108 is realized as a relational multi-tenant database that is communicatively coupled to the application server 102 as part of an on-demand multi-tenant database system 105. In this regard, the database 108 is shared between multiple tenants supported by the application server 102 and/or application platform 104, that is, the database 108 may store or otherwise maintain data associated with a number of different tenants, as described in greater detail below in the context of FIG. 8. In this regard, information pertaining to the site 114 and the devices 120, 122, 124, 126 of the monitoring system 112 (and the environmental measurement data received therefrom) may be associated with or otherwise assigned the unique tenant identifier for a tenant, such that that information is maintained in association with that tenant, thereby indicating that tenant is associated with that site 114 (e.g., the site 114 is the tenant's place of business). The application server 102 generally represents a computing system or another combination of processing logic, circuitry, hardware, and/or other components of the multi-tenant system 105 that is coupled to the network 110 and configured to support the various tasks, operations, functions, and processes described in greater detail below. In this regard, the application server 102 may include a processing system (e.g., a processor, controller, or the like) that includes or otherwise accesses a memory or another non-transitory computer-readable medium of storing programming instructions for execution by the processing system that, when read and executed by the processing system, cause the application server 102 and/or application platform 104 to generate or otherwise provide one or more application programming interfaces (APIs) that interface with the monitoring system 112, the client device 116 and the database 108 and perform the tasks, operations, functions, and processes described herein.

The client device 116 generally represents an electronic device coupled to the network 110 that is utilized by a user associated with (or belonging to) the tenant associated with the site 114 to access the application platform 104 and/or virtual application 106 on the application server 102. In practice, the client device 116 can be realized as any sort of personal computer, mobile telephone, tablet or other network-enabled electronic device that includes a display device, such as a monitor, screen, or another conventional electronic display, capable of graphically presenting data and/or information provided by the application platform 104 and/or the virtual application 106 along with a user input device, such as a keyboard, a mouse, a touchscreen, or the like, capable of receiving input data and/or other information from the user of the client device 116. In the illustrated embodiment, the user manipulates the client device 116 to execute a client application 118, such as a web browser application, and contact the application server 102 and/or application platform 104 using a networking protocol, such as the hypertext transport protocol (HTTP) or the like. The application platform 104 authenticates or otherwise identifies the user and generates the virtual application 106 at run-time based upon information and/or data associated with the user and/or the user's tenant that is maintained by the database 108. In this regard, the virtual application 106 includes code, data and/or other dynamic web content provided to the client device 116 that can be parsed, executed or otherwise presented by the client application 118 running on the client device 116.

In accordance with one or more embodiments, the virtual application 106 provides GUI displays that include GUI elements adapted to allow the user to create, define, or otherwise modify one or more monitoring rules for environmental conditions at the site 114. In this regard, a monitoring rule is a set of one or more criteria for measurements of one or more environmental conditions from one or more sensor devices at a site that dictate or otherwise govern the manner in which an electrical appliance at that site should be operated to influence or otherwise modify an environmental condition at the site (e.g., when the electrical appliance should be activated and/or deactivated). Based on the association between the user's tenant and the monitoring system 112 at the site 114 maintained by the database 108, the application platform 104 may obtain information pertaining to the devices 122, 124, 126 and electrical appliances 128 at the site 114 from the database 108 and update the virtual application 106 to provide information pertaining to the number and type of sensor devices 122, 124, actuator devices 126, and electrical appliances 128 at the site along with GUI elements adapted to allow the user to define one or more monitoring rules, such as, for example, which environmental conditions are to be measured, which locations or sensor devices 122, 124 at the site 114 should make those measurements, how frequently those environmental conditions should be measured, and how the electrical appliances 128 at the site 114 should be operated based on the environmental measurement data for those environmental conditions at those locations at the site 114, and the like. As described in greater detail below, based on the monitoring rules defined by the user and/or tenant and the environmental measurement data received from the monitoring system 112 at the site 114, the application server 102 and/or application platform 104 automatically determines how a particular electrical appliance 128 at the site 114 should be operated and instructs the appropriate actuator device 126 to effectuate that operation of that electrical appliance 128. In this manner, the application server 102 and/or application platform 104 is capable of autonomously monitoring and regulating environmental conditions at the site 114 substantially in real-time (and thereby controlling the consumption of energy from the energy source 130 substantially in real-time) without manual intervention.

It should be understood that FIG. 1 is merely one simplified representation of the on-demand energy management system 100 provided for purposes of explanation and is not intended to limit the subject matter described herein in any way. In this regard, although FIG. 1 depicts the use of an actuator device 126 communicatively coupled to the application server 102 and/or application platform 104 via the wireless mesh network of the monitoring system 112, in other embodiments, the on-demand energy management system 100 may utilize an actuator that is communicatively coupled to the application server 102 and/or application platform 104 via the network 110 independently of the monitoring system 112, as described in greater detail below in the context of FIG. 5. Furthermore, the individual devices 120, 122, 124, 126 of the monitoring system 112 are not limited to functioning solely as a hub device, a sensor device, or an actuator device, and in practice, an individual device may function as both a hub device and a sensor device, a sensor device and an actuator device, or a hub device, a sensor device, and an actuator device. For example, the hub device 120 may also include one or more auxiliary sensing elements, so that the hub device 120 may also function as a sensor device that obtains environmental measurement data for environmental conditions in its vicinity, or a sensor device 124 may include an auxiliary actuating element to control operation of an electrical appliance in its vicinity.

Figure 2:
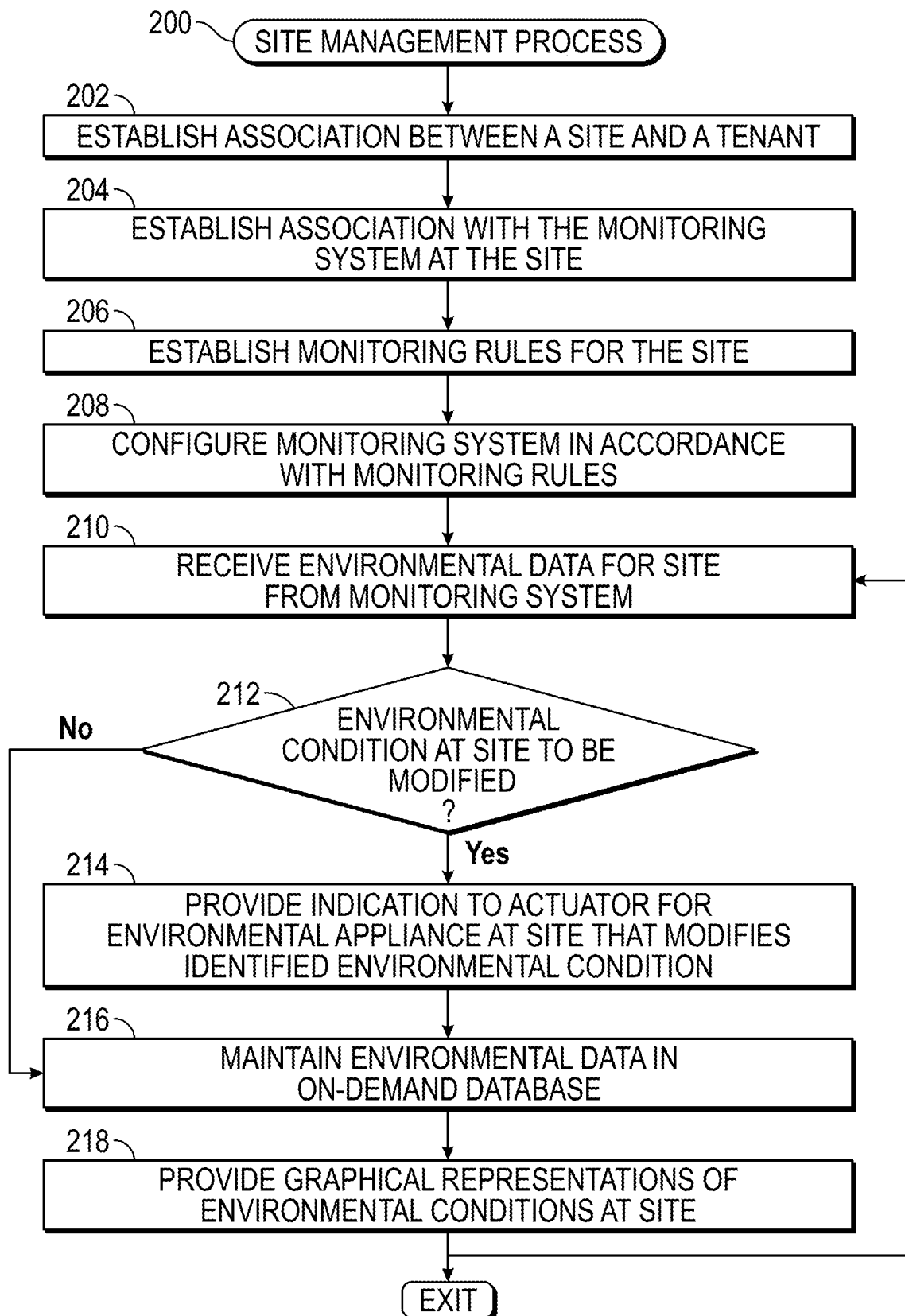
FIG. 2 is a flow diagram of an exemplary site management process suitable for implementation by the energy management system of FIG. 1.

FIG. 2 depicts an exemplary embodiment of a site management process 200 suitable for implementation by an energy management system, such as on-demand energy management system 100, to monitor and regulate one or more environmental conditions at a site, and thereby control energy usage associated with the site. The various tasks performed in connection with the illustrated process 200 may be performed by software, hardware, firmware, or any combination thereof. For illustrative purposes, the following description may refer to elements mentioned above in connection with FIG. 1. In practice, portions of the site management process 200 may be performed by different elements of the on-demand energy management system 100, such as, for example, the application server 102, the application platform 104, the monitoring system 112, the hub device 120, the sensor devices 122, 124, the actuator device 126, the electrical appliance 128 and/or the client device 116. It should be appreciated that the site management process 200 may include any number of additional or alternative tasks, the tasks need not be performed in the illustrated order and/or the tasks may be performed concurrently, and/or the site management process 200 may be incorporated into a more comprehensive procedure or process having additional functionality not described in detail herein. Moreover, one or more of the tasks shown and described in the context of FIG. 2 could be omitted from a practical embodiment of the site management process 200 as long as the intended overall functionality remains intact.

In an exemplary embodiment, the site management process 200 begins by identifying a site to be managed by the on-demand system, establishing an association between the site and a tenant supported by the on-demand system, and establishing an association between a monitoring system and the site (tasks 202, 204). In accordance with one embodiment, the association between a tenant and a site to be managed may be indicated by a user associated with that tenant. For example, a user of the client device 116 may manipulate client application 118 to contact the application server 102 and/or application platform 104, which, in turn, generates an instance of the virtual application 106 within the client application 118 on the client device 116 based on data and/or information associated with the user and/or the user's tenant obtained from the database 108. The generated instance of the virtual application 106 may include GUI elements adapted to allow the user to input or otherwise provide information identifying a site 114 to be monitored, such as, for example, the street address of the site 114, the latitude and/or longitude of the site 114 or other GPS coordinates for the site 114, the altitude of the site 114 (e.g., the particular floors of a building), or the like. After the site 114 is defined, the application platform 104 stores or otherwise maintains the positional information and/or other identifying information that defines the site 114 in the database 108 in association with the user's tenant (e.g., using that tenant's unique identifier). In another embodiment, the association between a tenant and a site may be automatically identified by the application platform 104 in response to identifying the monitoring system 112 and/or devices 120, 122, 124, 126 as being positioned at a known location associated with the tenant. For example, the database 108 may store positional information pertaining to the location of a principal place of business of the tenant or another location associated with the tenant, wherein the application platform 104 identifies that location as the site to be monitored in response to identifying the monitoring system 112 and/or devices 120, 122, 124, 126 as being positioned at that location.

In exemplary embodiments, the application platform 104 establishes an association between the site 114 and the monitoring system 112 and/or devices 120, 122, 124, 126 after determining or otherwise identifying that the devices 120, 122, 124, 126 are positioned at the site 114. For example, in exemplary embodiments, when the hub device 120 is initially powered on or installed at the site 114 and communicatively coupled to the network 110, the hub device 120 obtains its position (e.g., using its associated GPS receiver) and provides its position to the application platform 104 via the network 110. In response, the application platform 104 automatically identifies the hub device 120 as being located at the site 114, for example, by comparing the position of the hub device 120 with positional information for known locations of tenants maintained by the database 108 and identifying the location of the site 114 as being the nearest to the position of the hub device 120 or identifying when the position of the hub device 120 is within a threshold distance of the site 114. In some embodiments, after determining the hub device 120 is located at the site 114, the application platform 104 may obtain the tenant identifier for the tenant associated with that site location and implement a table or another data structure that maintains an association between the tenant identifier for that site's tenant and an identifier associated with the hub device 120 (e.g., an address of the hub device 120 on the network 110) so that data and/or information received from the hub device 120 is mapped to that tenant and associated with that tenant in the database 108. In this manner, the application platform 104 may maintain an association between the hub device 120 of the monitoring system 112 and the tenant associated with the site 114. When the tenant is associated with multiple different sites, the application platform 104 and/or database 108 may also maintain an association between the hub device 120 and that particular site 114 using a unique site identifier associated with the site 114. In a similar manner, when remaining devices 122, 124, 126 initially establish communications with the hub device 120 via the wireless mesh network, each of the respective devices 122, 124, 126 may obtain its position and provide its position to the application platform 104 via the network 110 for association with the site 114 and/or site tenant. In alternative embodiments, the association between the monitoring system 112 and a tenant may be established manually, for example, by a user associated with the tenant utilizing the virtual application 106 and manipulating the client device 116 to input or otherwise provide information identifying the various devices 120, 122, 124, 126 that are or will be installed at the site 114.

In an exemplary embodiment, the site management process 200 continues by identifying, obtaining, or otherwise establishing one or more monitoring rules for the site being managed (task 206). As discussed above, a monitoring rule is a set of one or more criteria for one or more environmental conditions at the site that governs how one or more electrical appliances at a site should be operated to regulate environmental conditions at the site, and thereby, governs the corresponding energy usage associated with the site. For example, if the electrical appliance 128 is a heater, a monitoring rule for the site 114 may indicate that the heater should be powered or otherwise operated via the actuator device 126 when a temperature measurement obtained by one of the sensor devices 122, 124 falls below a threshold value, or conversely, that the heater should be powered off or otherwise deactivated via the actuator device 126 when a temperature measurement from one of the sensor devices 122, 124 exceeds another threshold value. As another example, when the electrical appliance 128 is a lamp proximate a particular sensor device 124, a monitoring rule may indicate that the lamp should be turned on via the actuator device 126 when that sensor device 124 detects motion, or conversely, that the lamp should be turned off when the sensor device 124 does not detect motion over a prescribed time period. It will be appreciated that there are numerous possible combinations of sensor devices, actuator devices, and electrical appliances, which, in turn, results in numerous possible monitoring rules that may be defined for a particular site. In addition to measurement criteria for environmental conditions, a monitoring rule may also include various timing criteria that dictate a duration over which the measurement criteria should be satisfied or violated before undertaking any action. For example, a monitoring rule may include timing criteria that indicates a temperature measurement should fall below a threshold value for a specified duration of time before the heater at the site is operated.

In a similar manner as described above, in exemplary embodiments, the application platform 104 generates or otherwise provides GUI elements within the virtual application 106 that are adapted to allow the user to define measurement criteria, timing criteria, and corresponding actions for the various monitoring rules to be associated with the site 114. For example, the application platform 104 may access the database 108 to obtain information pertaining to the types of sensor devices 122, 124, actuator devices 126 and/or electrical appliances 128 at the site 114 and/or their respective positions within the site 114 and generate GUI elements adapted to allow the user to define measurement criteria (e.g., threshold values and the like) for measurements of environmental condition(s) obtained from the sensor devices 122, 124, any desired timing criteria for those measurement criteria, and corresponding actions to be undertaken by the actuator devices 126 when the measurement data from the sensor devices 122, 124 satisfy the specified measurement criteria and/or timing criteria. After the user has defined the desired monitoring rules for the site 114, the application platform 104 stores or otherwise maintains information pertaining to the criteria and actions for those monitoring rules in the database 108 in association with the user's tenant and/or the site 114. In other embodiments, the application platform 104 may obtain default monitoring rules that are predefined by the manufacturer of a respective sensor device 122, 124 (e.g., from the database 108 and/or via the network 110) using an identifier associated with that respective sensor device 122, 124.

In accordance with one or more embodiments, the site management process 200 continues by configuring the devices of the monitoring system for operation in accordance with the monitoring rules (task 208). In this regard, the application platform 104 provides configuration information to the devices 120, 122, 124, 126 that is utilized by the respective devices 120, 122, 124, 126 to automatically configure themselves for operation in accordance with the monitoring rules for the site 114, as described in greater detail below in the context of FIG. 7. In accordance with one or more embodiments, based on the timing criteria for the monitoring rules associated with the site 114, the application platform 104 may automatically determine a minimum sampling frequency (or rate) at which the individual sensor devices 122, 124 should obtain measurements for different environmental conditions and/or a minimum upload frequency (or rate) at which the hub device 120 should transmit measurement data obtained by the sensor devices 122, 124 to the application platform 104. For example, if a monitoring rule indicates a heater should be operated whenever a temperature measurement from the sensor device 124 falls below a threshold value for 5 minutes or more, the application platform 104 may automatically determine a sampling frequency for the sensor device 124 so that the sensor device 124 obtains a temperature measurements at a rate greater than once every 5 minutes, and also, an upload frequency for the hub device 120 so that the hub device 120 transmits the obtained measurement data form the sensor device 124 to the application platform 104 at a rate greater than once every 5 minutes. In other embodiments, the user may define the desired sampling frequency for the sensor devices 122, 124 and/or the desired upload frequency for the hub device 120. To configure the respective devices 120, 122, 124, 126 for operation in accordance with the monitoring rules, the application platform 104 transmits code, commands, instructions, or other indications of the desired operating frequencies and/or other configuration information for the respective device 120, 122, 124, 126 to the hub device 120 via the network 110 along with an indication of the respective device 120, 122, 124, 126 that configuration information pertains to, and, in turn, the hub device 120 routes, transmits, or otherwise provides that information to the appropriate device 122, 124, 126 via the wireless mesh network. In response to receiving configuration information, each respective device 120, 122, 124, 126 automatically configures itself for operation in accordance with the received configuration information, as described in greater detail below.

Still referring to FIG. 2, the site management process 200 continues by receiving environmental measurement data from the monitoring system at the site and determining whether an environmental condition at the site should be modified based on the monitoring rules for the site (tasks 210, 212). In this regard, after the devices 120, 122, 124, 126 are associated with the site 114 and configured for operation, the devices 120, 122, 124, 126 operate autonomously in accordance with the received configuration information to provide environmental measurement data to the application platform 104. In this regard, each respective sensor device 122, 124 automatically samples the outputs of its auxiliary sensing elements with the desired sampling frequencies to obtain measurements of environmental conditions in its vicinity and transmits or otherwise provides the obtained environmental measurement data to the hub device 120. In exemplary embodiments, the hub device 120 automatically stores or batches the environmental measurement data from the sensor devices 122, 124 before automatically uploading or otherwise transmitting the environmental measurement data from the sensor devices 122, 124 to the application server 102 collectively at the desired upload frequency. After receiving the environmental measurement data from the sensor devices 122, 124, the application platform 104 automatically determines whether any actions should be undertaken to modify environmental conditions at the site 114 based on the monitoring rules for the site 114. For example, in response to receiving environmental measurement data from the site 114, the application platform uses the tenant identifier and/or site identifier associated with the monitoring system 112 and/or devices 120, 122, 124 to obtain the monitoring rules for the site 114 from the database 108 and compares the environmental measurement data to the measurement criteria of those monitoring rules to determine whether any actions at the site 114 should be undertaken. In this regard, the application platform 104 automatically compares measured values for environmental conditions obtained from the sensor devices 122, 124 at the site 114 with threshold values for those environmental conditions provided by the monitoring rules for the site 114 and identifies the actions that should be undertaken or which environmental conditions should be modified. For example, if the electrical appliance 128 is a heater and a monitoring rule for the site 114 indicates a temperature in the vicinity of the sensor device 124 should not fall below 70° F. when the sensor device 124 detects motion in its vicinity and the environmental measurement data from the sensor device 124 indicates that it detected motion and the temperature is 68° F., the application platform 104 may determine that the electrical appliance 128 should be operated or otherwise activated to modify the temperature in the vicinity of the sensor device 124.

In response to determining an action should be undertaken to modify an environmental condition at a site, the site management process 200 continues by signaling or otherwise providing indication of that action to the actuator for the environmental appliance at the site that influences that environmental condition (task 214). In this manner, the application platform 104 effectuates the desired modification to the environmental condition, and thereby autonomously regulates the environmental condition in accordance with the monitoring rules. For example, continuing the above example where the electrical appliance 128 is a heater, the application platform 104 transmits or otherwise provides, to the hub device 120 via the network 110, an indication that the actuator device 126 should operate the heater 128 when the sensor device 124 detects motion and a temperature less than the threshold value, wherein the hub device 120 automatically transmits the indication to the actuator device 126 via the wireless mesh network. In response to receiving the indication from the application platform 104, the actuator device 126 operates the heater 128, for example, by operating a relay or switch (or another auxiliary actuating element associated with the actuator device 126) to provide power (or energy) from the energy source 130 to the heater 128. The heater 128 is thereby autonomously operated to generate heat and thereby increase the temperature in the vicinity of the sensor device 124 without manual interaction.

In exemplary embodiments, the site management process 200 continues by updating the on-demand database to store or otherwise maintain the received environmental measurement data for the site (task 216). For example, the application platform 104 may store the received environmental measurement data in the database 108 in a manner that maintains an association between the environmental measurement data and the tenant and/or site 114 (e.g., using the tenant identifier for the tenant associated with the site 114). Additionally, the application platform 104 may store information pertaining to the current state of the actuator devices 126 and/or the electrical appliances 128 at the site 114.

In accordance with one or more embodiments, the site management process 200 continues by generating or otherwise providing one or more graphical representations of the environmental data at the site (task 218). For example, the user of the client device 116 may manipulate one or more GUI elements provided by the virtual application 106 to indicate a desire view the environmental data or information pertaining to the site 114, wherein in response to receiving the indication of a desire to view the environmental data for the site 114, the application platform 104 utilizes the tenant identifier associated with the user of the client device 116 and/or a site identifier corresponding to the site 114 indicated by the user to retrieve, from the database 108, the environmental data for the site 114 and generates graphical representations of the environmental data, such as, for example, one or more tables, charts, graphs, or the like that visually depict the measured values for environmental conditions at the site 114 obtained by the sensor devices 122, 124 or the operational status of the actuator devices 126 and/or the electrical appliances 128 at the site 114. In some embodiments, the application platform 104 may utilize the information pertaining to the operating state of the actuator devices 126 and/or the electrical appliances 128 at the site 114 to calculate or otherwise determine an estimated energy usage for the site 114 and generate a graphical representation that visually depicts the estimated energy usage for the site 114.

As illustrated in FIG. 2, in exemplary embodiments, the site management process 200 continues by periodically receiving updated environmental measurement data that is autonomously provided by the monitoring system at the site, determining whether actions need to be taken to modify environmental conditions at the site based on the updated environmental measurement data, providing indication of those actions to actuators for electrical appliances at the site, and updating the tenant's environmental data in the on-demand database and/or any graphical representations thereof (tasks 210, 212, 214, 216 and 218). For example, the sensor devices 122, 124 may continue autonomously measuring environmental conditions at the site 114 at the desired sampling frequency and providing that environmental measurement data via the wireless mesh network to the hub device 120, which, in turn, continues automatically batching the environmental measurement data and periodically transmitting the environmental measurement data for the site 114 to the application platform 104 via the network 110 with the desired upload frequency. In a similar manner as described above, in response to receiving updated environmental measurement data from the sensor devices 122, 124, the application platform 104 determines whether any actions should be undertaken to modify environmental conditions at the site 114 based on the monitoring rules for the site 114. For example, continuing the above example where the electrical appliance 128 is a heater, if a monitoring rule for the site 114 indicates the heater should be disabled whenever the temperature exceeds 72° F. and the environmental measurement data from the sensor device 124 indicates that the temperature is 73° F., the application platform 104 may determine that the heater 128 should be disabled or otherwise deactivated. In a similar manner as described above, the application platform 104 provides indication that the actuator device 126 should cease operating the electrical appliance 128 to the hub device 120 via the network 110, wherein the hub device 120 automatically provides the indication to the actuator device 126 via the wireless mesh network. In response, the actuator device 126 ceases operating the electrical appliance 128, for example, by operating its associated relay or another actuating element to prevent power (or energy) from the energy source 130 from being provided to to the electrical appliance 128. As described above, the application platform 104 may update the database 108 to store or otherwise maintain the updated environmental measurement data and the updated status of the actuator devices 126 and/or electrical appliances 128 associated with the site 114. In this manner, when the user of the client device 116 subsequently indicates a desire view information pertaining to the site 114, the application platform 104 generates graphical representations that reflect the updated environmental data and the current status of the actuator devices 126 and/or electrical appliances 128 at the site 114.

Figure 3:
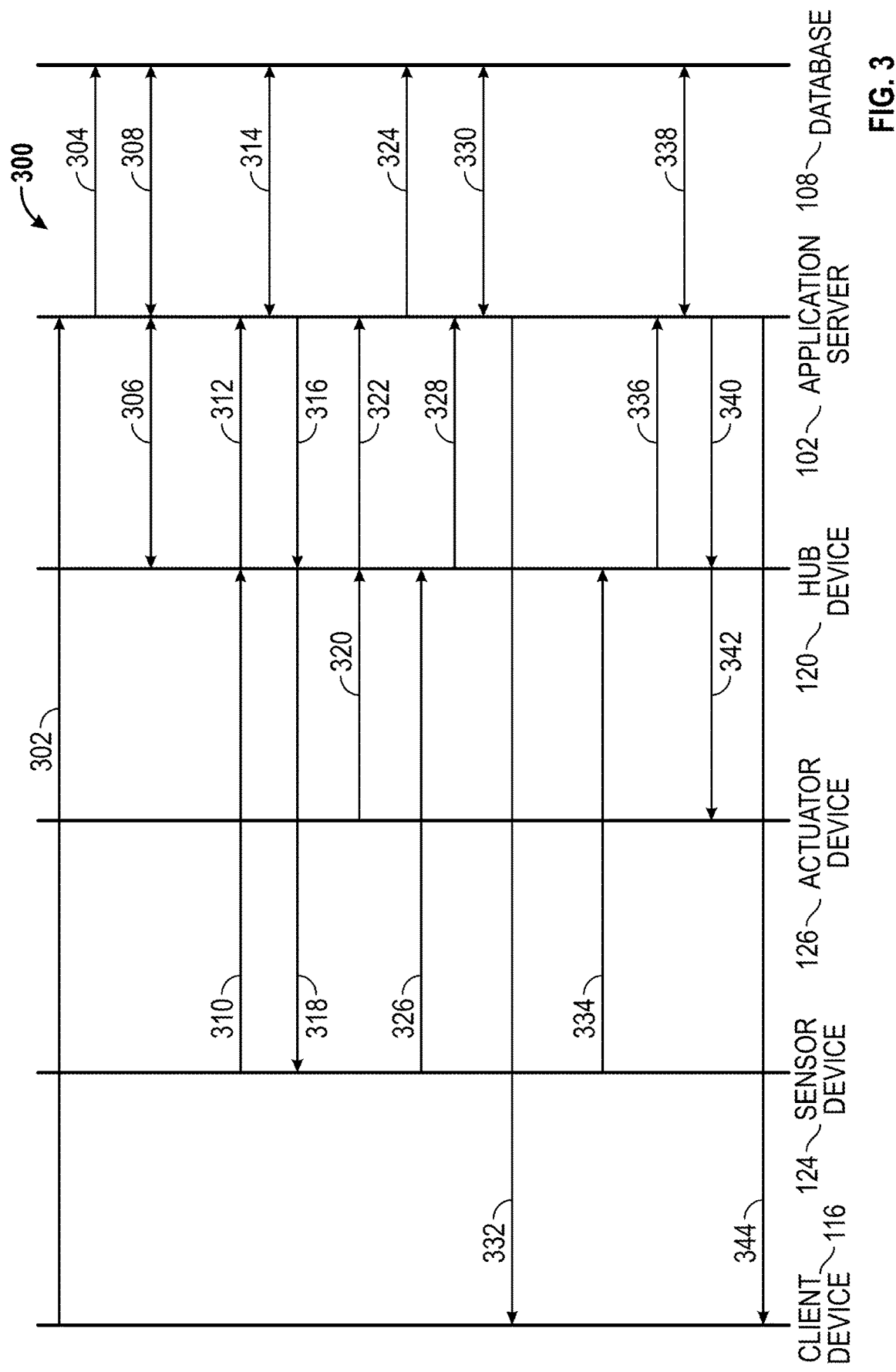
FIG. 3 is a diagram illustrating communications within the energy management system of FIG. 1 in accordance with one exemplary embodiment of the site management process of FIG. 2.

FIG. 3 illustrates an exemplary sequence 300 of communications within the on-demand energy management system 100 in accordance with an exemplary embodiment of the site management process 200 of FIG. 2. Referring to FIG. 3, and with continued reference to FIGS. 1-2, the illustrated sequence 300 begins with a user manipulating the client device 116 to contact the application server 102 and providing 302 information defining a site 114 to be managed and/or one or more monitoring rules to be associated with that site 114 to the application platform 104 via the virtual application 106. The application platform 104 stores 304 the definitional information provided by the user for the site 114 to be managed and the monitoring rules for the site 114 in the database 108 in a manner that maintains an association between the site 114 and the monitoring rules, for example, by using that tenant's unique identifier and/or a unique identifier for the site 114.

In exemplary embodiments, when a hub device 120 is subsequently powered on or installed at the site 114, the hub device 120 automatically creates or otherwise establishes a wireless mesh network, obtains its position, and communicates 306 its position along with a request for configuration information to the application server 102 via the network 110, as described in greater detail below in the context of the device initialization process 700 of FIG. 7. Using the position of the hub device 120, the application platform 104 accesses 308 the database 108 and determines that the hub device 120 is located at the site 114 based on the position of the hub device 120 and the location information for the site 114 maintained by the database 108. After determining the hub device 120 is at the site 114, the application platform 104 stores information pertaining to the hub device 120 in the database 108 in association with the site 114 and/or the site tenant. In exemplary embodiments, the application platform 104 obtains one or more monitoring rules for the site 114 from the database 108 and determines configuration information for the hub device 120 based at least in part on the one or more monitoring rules so that the hub device 120 is operated in accordance with the monitoring rules. For example, the application platform 104 may determine communication configuration information, such as a frequency or rate at which the hub device 120 should provide batches of environmental measurement data to the application server 102 based on the timing criteria associated with the monitoring rules for the site 114. In exemplary embodiments, the application platform 104 responds to the hub device 120 by providing a response that includes the configuration information to the hub device 120, which, in turn, automatically configures itself for operation in accordance with the received configuration information, as described below.

Still referring to FIG. 3, when a sensor device 124 is powered on or installed at the site 114, the sensor device 124 automatically obtains its position and communicates 310 a request for configuration information that includes its position and identifying information pertaining to its associated auxiliary sensing elements to the hub device 120 via the wireless mesh network, as described in greater detail below in the context of FIG. 7. The hub device 120 automatically communicates 312 the sensor configuration information request to the application server 102 via the network 110. The application platform 104 stores 314 the position and identifying information for the sensor device 124 in the database 108 in association with the site 114 and/or the site tenant. Based on the position and identifying information associated with the request, the application platform 104 identifies monitoring rules for the site 114 maintained by the database 108 that are relevant to the sensor device 124 and identifies or otherwise determines configuration information for the sensor device 124 so that the sensor device 124 is operated in accordance with the monitoring rules for the site 114. For example, the application platform 104 may determine sampling frequencies for the various sensing elements of the sensor device 124 based on the timing criteria defined by the monitoring rules for the site 114 that pertain to the sensor device 124. The application platform 104 transmits or otherwise provides 316 the sensor configuration information to the hub device 120 via the network 110, whereby the hub device 120 transmits, routes or otherwise provides 318 the sensor configuration information to the sensor device 124 via the wireless mesh network. The sensor device 124 automatically configures itself for operation in accordance with the received sensor configuration information, as described in greater detail below in the context of FIG. 7.

Likewise, in the illustrated embodiment of FIGS. 1 and 3, when the actuator device 126 is powered on or installed at the site 114, the actuator device 126 automatically obtains its position and transmits or otherwise provides 320 its position along with identifying information (e.g., information pertaining to the type of actuating element and/or electrical appliance 128 associated with the actuator device 126) and status information (e.g., the current state of the actuating element and/or electrical appliance 128) to the hub device 120 via the wireless mesh network. As described above, the hub device 120 transmits or otherwise provides 322 the information for the actuator device 126 to the application server 102 via the network 110, and the application platform 104 stores 324 the information pertaining to the actuator device 126 in the database 108 in association with the site 114 and/or the site tenant.

As described above in the context of FIG. 2, after a sensor device 124 at the site 114 self-configures, the sensor device 124 automatically obtains measurements of environmental conditions in its vicinity in accordance with the sensor configuration information provided by the application platform 104. In this regard, the sensor device 124 samples the outputs of the various sensing elements with the desired sampling frequency for that environmental condition and transmits or otherwise provides 326 the measured values for those environmental conditions to the hub device 120 via the wireless mesh network. The hub device 120 may temporarily store or otherwise maintain the environmental measurement data from the sensor device 124 for batching with additional environmental measurement data from another sensor device 122 and/or the same sensor device 124 before collectively transmitting or otherwise providing 328 the batched environmental measurement data for the site 114 to the application server 102 via the network 110.

After receiving the environmental measurement data from the hub device 120 at the site 114, using the association between the hub device 120 and the site 114 and/or the site tenant, the application platform 104 accesses 330 the database 108 to retrieve the monitoring rules for the site 114 and store the received environmental measurement data for the site 114 in association with the site 114 and/or site tenant. In other words, the application platform 104 updates the environmental measurement data for the site 114 maintained by the database 108 to include the most recently received environmental measurement data. As described above in the context of FIG. 2, the application platform 104 determines whether any actions should be undertaken to modify environmental conditions at the site 114 by comparing the environmental measurement data to the criteria of the monitoring rules for the site 114. When the application platform 104 determines that no action is required, the application platform 104 may respond to the hub device 120 with an indication that no action should be performed by the devices 122, 124, 126 and/or electrical appliances 128 at the site 114. In this manner, the actuator device 126 and/or electrical appliance 128 may maintain its current state while the devices 120, 122, 124 continue autonomous operation. For example, if the electrical appliance 128 is a heater and a monitoring rule for the site 114 indicates a temperature in the vicinity of the sensor device 124 should not fall below 70° F. when the sensor device 124 detects motion in its vicinity and the environmental measurement data from the sensor device 124 indicates that the temperature is 68° F. but the sensor device 124 is not detecting motion, the application platform 104 may determine that the electrical appliance 128 may be maintained in a deactivated (or off) state. In accordance with one or more embodiments, the application platform 104 may generate or otherwise provide 332 a graphical representation of the received environmental measurement data within the virtual application 106 presented on the client device 116, as described in greater detail below in the context of FIG. 4. For example, if the virtual application 106 is currently being utilized by the user of the client device 116 to monitor the site 114, the application platform 104 may automatically push the updated environmental measurement data to the client device 116 or otherwise automatically update a GUI display presented by the virtual application 106 on the client device 116 to reflect the received environmental measurement data substantially in real-time. In other embodiments, the application platform 104 may generate and provide the graphical representations of the tenant's environmental measurement data from the database 108 in response to the user of the client device 116 manipulating the client device 116 and/or client application 118 to select or otherwise indicate a desire to view the environmental measurement data for the site 114.

Still referring to FIG. 3, the sensor device 124 at the site 114 continues automatically obtaining measurements of environmental conditions in its vicinity and transmitting or otherwise providing 334 the recently measured values to the hub device 120, which automatically batches the environmental measurement data for the site 114 and collectively transmits or otherwise provides 336 the updated batch of environmental measurement data for the site 114 to the application server 102 via the network 110. After receiving the updated environmental measurement data, the application platform 104 accesses 338 the database 108 to store the updated environmental measurement data for the site 114 in association with the site 114 and/or site tenant, retrieve the monitoring rules for the site 114, and determine whether any actions should be undertaken to modify environmental conditions at the site 114 by comparing the updated environmental measurement data (either individually or in combination with the previous environmental measurement data) to the criteria of the monitoring rules for the site 114. When the application platform 104 determines that an action is required to modify an environmental condition at the site 114, the application platform 104 identifies or otherwise determines the actuator device 126 associated with the electrical appliance 128 that influences or otherwise modifies that environmental condition and transmits 340, to the hub device 120 via the network 110, a command, instruction, or another indication of how that actuator device 126 should operate the electrical appliance 128 to achieve the desired modification of the environmental condition. For example, continuing the above example where the electrical appliance 128 is a heater, if the monitoring rule for the site 114 indicates a temperature in the vicinity of the sensor device 124 should not fall below 70° F. when the sensor device 124 detects motion in its vicinity and the environmental measurement data from the sensor device 124 indicates that the temperature is 68° F. and the sensor device 124 detected motion, the application platform 104 may determine that the heater 128 should be activated or otherwise operated and provide indication of the manner in which the actuator device 126 should operate the heater 128 to the hub device 120. For example, if the actuator device 126 includes a relay configured in series between the energy source 130 and the electrical appliance 128, the application platform 104 may provide an indication or command to close the relay.

As described above in the context of FIG. 2, the hub device 120 transmits or otherwise provides 342 the indication to the actuator device 126, which, in turn operates the electrical appliance 128 in the desired manner, for example, by closing the relay to provide power from the energy source 130 to the electrical appliance 128. In this manner, the actuator device 126 and/or the electrical appliance 128 may be autonomously controlled, operated, or otherwise regulated by the application server 102 and/or application platform 104 based on the monitoring rules for the site 114 and the environmental measurement data received from sensor devices 122, 124 the site 114 without any manual interaction. As described above, the application platform 104 may also update the status information for the actuator device 126 and/or the electrical appliance 128 maintained in the database 108 to reflect the change in operational status. Additionally, the application platform 104 may generate or otherwise provide 344 a graphical representation of the updated status of the actuator device 126 and/or the electrical appliance 128 at the site along with one or more graphical representations of the updated environmental measurement data within the virtual application 106 presented on the client device 116. For example, the application platform 104 may automatically push the updated environmental measurement data and status information to the client device 116 or otherwise automatically update a GUI display presented on the client device 116 to reflect the updated environmental measurement data and the status information substantially in real-time. In this manner, the user of the client device 116 may view or otherwise monitor the current environmental conditions at the site 114 along with the current status of the electrical appliances 128 at the site 114. However, as noted above, manual interaction by the user of the client device 116 is not required to operate the actuator devices 126 and/or the electrical appliances 128 at the site 114 or otherwise regulate the environmental conditions at the site 114.

Figure 4:
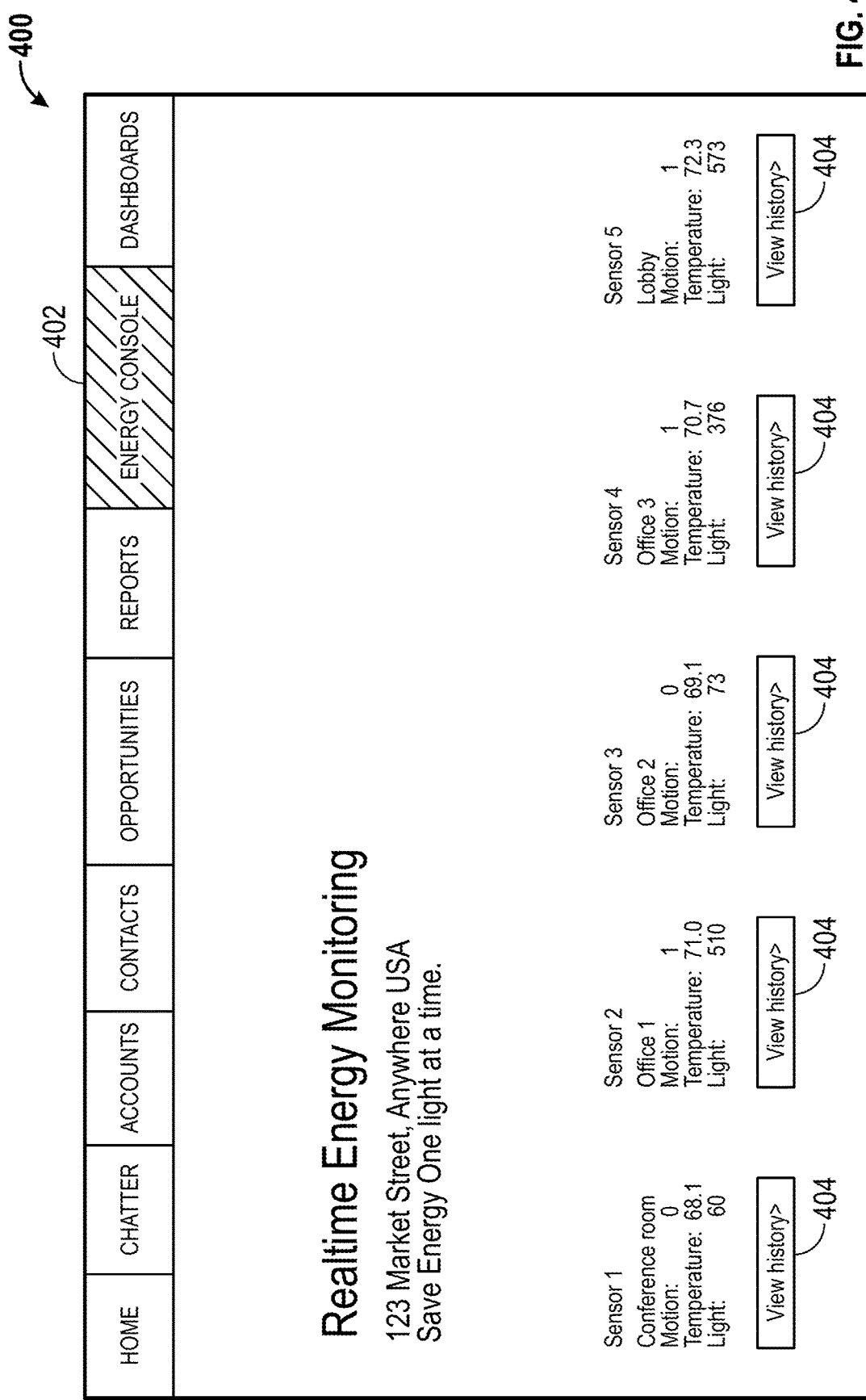
FIG. 4 illustrates an exemplary display that may be presented on a client device in the energy management system of FIG. 1 in accordance with one exemplary embodiment.

FIG. 4 illustrates an exemplary GUI display 400 that may be graphically presented by the application platform 104 and/or virtual application 106 within a browser application executing on a client device, such as the client application 118 on the client device 116, to graphically represent the environmental measurement data and/or other status information for a site. In this regard, the display 400 represents a portion of the visual area on the electronic display associated with a client device 116. In practice, the display 400 may be realized as or otherwise derived from one or more screens integrated with or otherwise supported by the application platform 104, which may be custom screens specific to the site tenant or standard screens supported by the application platform 104, as described in greater detail below in the context of FIG. 8.

In accordance with one embodiment, the user of the client device 116 manipulates a browser application (e.g., client application 118) to access the application platform 104 (e.g., by directing the browser application to an address on the network 110 that is associated with the application server 102), wherein the application platform 104 generates the virtual application 106 within the browser application that includes one or more GUI displays adapted to allow the user of the client device to select or otherwise indicate a desire to view or otherwise monitor information pertaining to the site 114 being managed (e.g., by selecting the 'ENERGY CONSOLE' tab 402). In response, the application platform 104 retrieves or otherwise obtains, from the database 108, identifying information for the various sensor devices 122, 124 at the site 114, the environmental measurement data obtained by those sensor devices 122, 124, and/or information pertaining to the status of the actuator devices 126 and/or electrical appliances 128 at the site 114 and generates or otherwise provides a graphical representation of the obtained information and/or data from the database 108 in the client application 118 on the client device 116. For example, in the illustrated embodiment, the application platform 104 generates or otherwise provides, for each sensor device, a graphical representation of the identification or name of the respective sensor device (e.g., 'Sensor 1' and the like), a graphical representation of the location of the respective sensor device within the site (e.g., 'Conference Room' and the like, which may be colloquially defined by a user), a graphical representation of the most recently measured value for motion in the vicinity of the respective sensor device, a graphical representation of the most recently measured value for temperature in the vicinity of the respective sensor device, and a graphical representation of the most recently measured value for luminance in the vicinity of the respective sensor device. As illustrated, the application platform 104 may also provide one or more selectable GUI elements 404 (e.g., buttons or the like) adapted to allow a user to indicate a desire to view additional graphical representations of the environmental measurement data for a particular sensor device, wherein in response to identifying selection of a GUI element, the application platform 104 generates additional graphical representations of the environmental measurement data for that sensor device, such as, for example, charts, graphs, or the like depicting previously measured values for environmental conditions in the vicinity of that sensor device relative to the most recently measured values for those environmental conditions. It should be appreciated that FIG. 4 is merely one example of a GUI display that may be presented by the application platform 104 in conjunction with the site management process 200 of FIG. 2, and in practice, numerous possible GUI displays may be generated based on the information pertaining to the site 114 maintained by the database 108.

Figure 5:
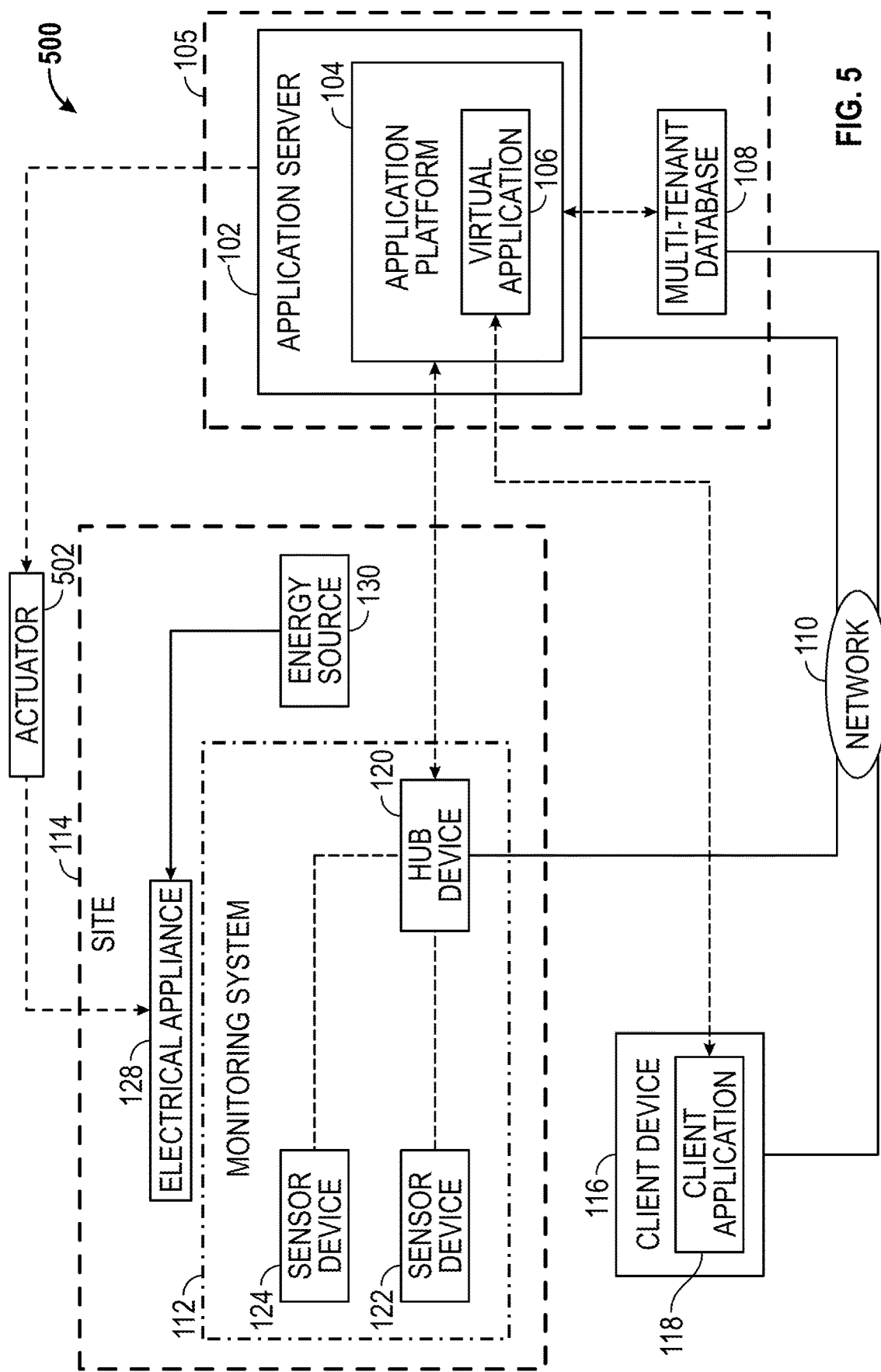
FIG. 5 is a block diagram of another exemplary on-demand energy management system.

Turning now to FIG. 5, in an alternative embodiment, an on-demand energy management system 500 utilizes an actuator 502 that is communicatively coupled to the application server 102 and/or application platform 104 via the network 110, independent of the hub device 120 or the wireless mesh network. In a similar manner as described above, the actuator 502 is associated with the electrical appliance 128 at the site 114 and controls operation of the electrical appliance 128 to regulate the amount of power (or energy) from the energy source 130 that is consumed by the electrical appliance 128. The actuator 502 may be a third-party system, such as an energy utility company or the like. In the embodiment of FIG. 5, the application platform 104 determines environmental condition to be modified and/or the relative position of where the environmental condition should be modified within the site 114 (e.g., based on the position of the sensor device having a measured value for the environmental condition that triggered the modification) and provides indication of the modification to the environmental condition and/or the position within the site 114 where that modification should occur, wherein the third-party actuator 502 determines which electrical appliance at the site 114 should be operated based on the received position and the environmental condition being modified and the manner in which that electrical appliance should be operated based on the modification indicated by the application platform 104.

Figure 6:
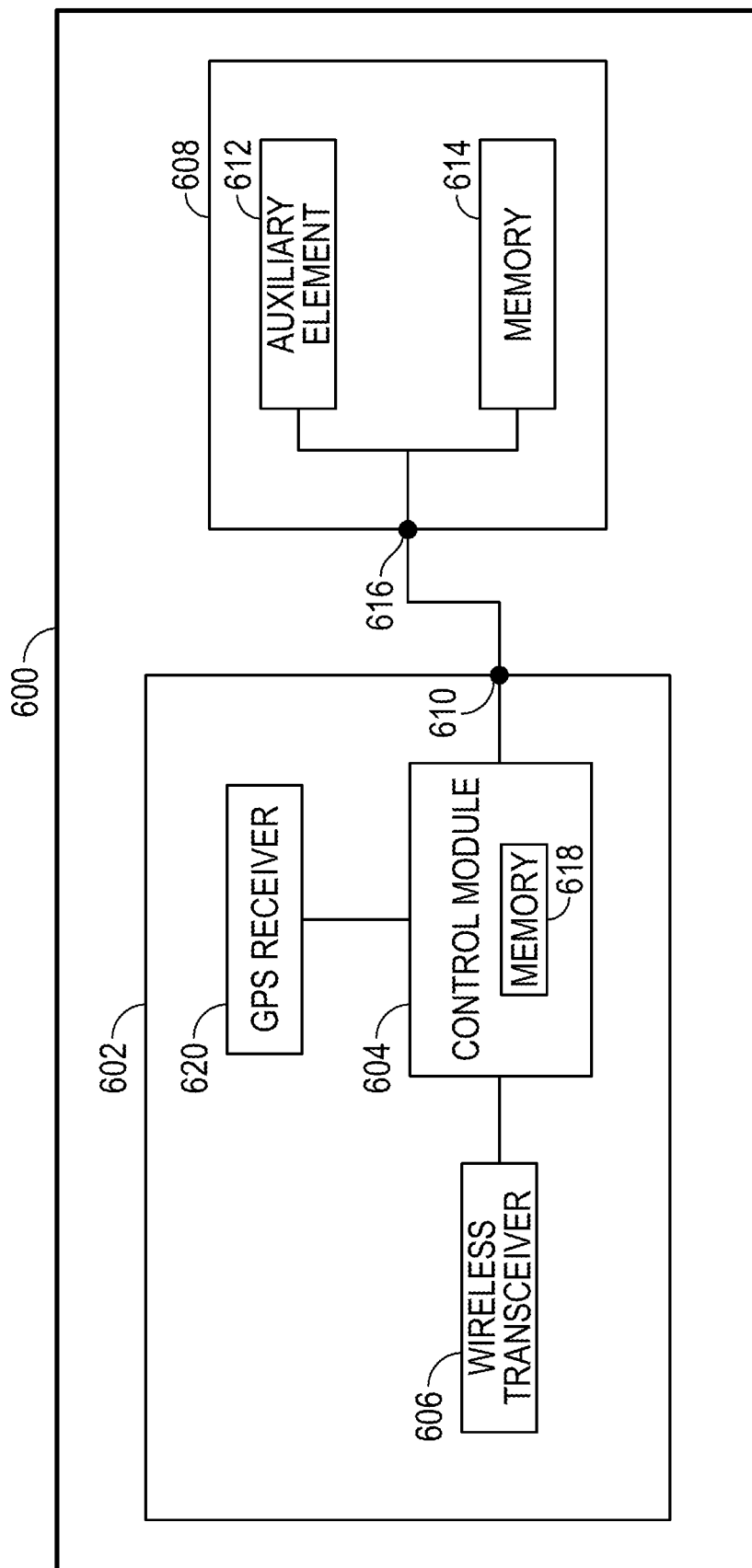
FIG. 6 is a block diagram of an exemplary device suitable for use in the on-demand energy management system of FIG. 1 or FIG. 5.

FIG. 6 depicts an exemplary embodiment of a device 600 suitable for use as one of the devices 120, 122, 124, 126 in the monitoring system 112 of FIG. 1 or FIG. 5. The device 600 includes, without limitation, a primary electronics substrate 602 having a control module 604 and a wireless transceiver 606 provided thereon, and one or more auxiliary electronics substrates 608 coupled to the primary electronics substrate 602. In this regard, the primary electronics substrate 602 includes a physical interface 610 (e.g., pins, ports, connectors or the like) adapted to mate with a corresponding physical interface 616 on the auxiliary substrate 608 to communicatively couple the control module 604 to an auxiliary element 612 and data storage element (or memory) 614 provided on the auxiliary substrate 608. Depending on the embodiment, the auxiliary element 612 may be a sensing element, an actuating element, a network interface, or another suitable component. In this regard, the type of auxiliary element 612 may dictate whether the device 600 functions as a hub device, a sensor device, or an actuating device. However, it should be noted that FIG. 6 is merely one simplified representation of the device 600 provided for purposes of explanation, and practical embodiments of the device 600 may include multiple auxiliary substrates 608 coupled to the primary substrate 602 having various combinations of sensing elements, actuating elements and/or network interfaces provided thereon, so that the device 600 may simultaneous function as a hub device, a sensor device and/or an actuator device.

In exemplary embodiments, the auxiliary substrate 608 is realized as a printed circuit board or another suitable electronics substrate having the auxiliary element 612 and the data storage element 614 affixed, mounted, formed, or otherwise provided thereon. In exemplary embodiments, the auxiliary substrate 608 includes conductive traces or the like adapted to couple the auxiliary element 612 and the memory 614 to the physical interface 616, and similarly, the primary substrate 602 includes conductive traces or the like adapted to couple the control module 604 to the physical interface 610. In this manner, the control module 604 is communicatively coupled to the auxiliary element 612 and the data storage element 614 when the substrates 602, 608 are coupled via the interfaces 610, 616. The data storage element 614 represents a non-transitory storage or other computer-readable media, such as ROM, that is capable of storing identification information indicating the type of auxiliary element 612 provided on the auxiliary substrate 608 and/or other programming instructions for execution on the control module 604. In this regard, the identification information maintained by the memory 614 is utilized to determine how to operate the auxiliary element 612, as described in greater detail below.

The control module 604 generally represents the combination of hardware, circuitry and/or other components that are affixed, mounted, formed, or otherwise provided on the primary substrate 602 and configured to support operation of the device 600 and execute the various functions and/or processing tasks described herein. In an exemplary embodiment, the control module 604 is realized as a microcontroller. However, it will be appreciated that the subject matter described herein is not limited to microcontrollers, and in other practical embodiments, the control module 604 may be realized as a processor, a controller, a microprocessor, a state machine, a content addressable memory, an application specific integrated circuit, a field programmable gate array, any suitable programmable logic device, discrete gate or transistor logic, discrete hardware components, or any combination thereof, designed to perform the functions described herein. In exemplary embodiments, the control module 604 includes a suitable amount of memory 618 or other non-transitory computer-readable storage media, such as ROM, that is capable of storing programming instructions that, when read and executed by the control module 604, cause the control module 604 to initiate or otherwise perform the device initialization process 700 of FIG. 7 and additional tasks, operations, functions, and/or processes described herein. The wireless transceiver 606 may be realized as a ZigBee transceiver, a Bluetooth transceiver, or another suitable wireless transceiver that is affixed, mounted, or otherwise provided on the primary substrate 602 and communicatively coupled to the control module 604 via conductive traces or the like fabricated on the primary substrate 602. In exemplary embodiments, the primary electronics substrate 602 also includes a position-determining module 620, such as a GPS receiver, that is affixed, mounted, or otherwise provided thereon that is coupled to the control module 604 to provide, to the control module 604, an indication of the current position (e.g., longitudinal and latitudinal location and altitude) of the device 600 for purposes of associating the device 600 with a particular site and/or tenant or otherwise identifying the location of the device 600 within a monitored site, as described in greater detail below.

Figure 7:
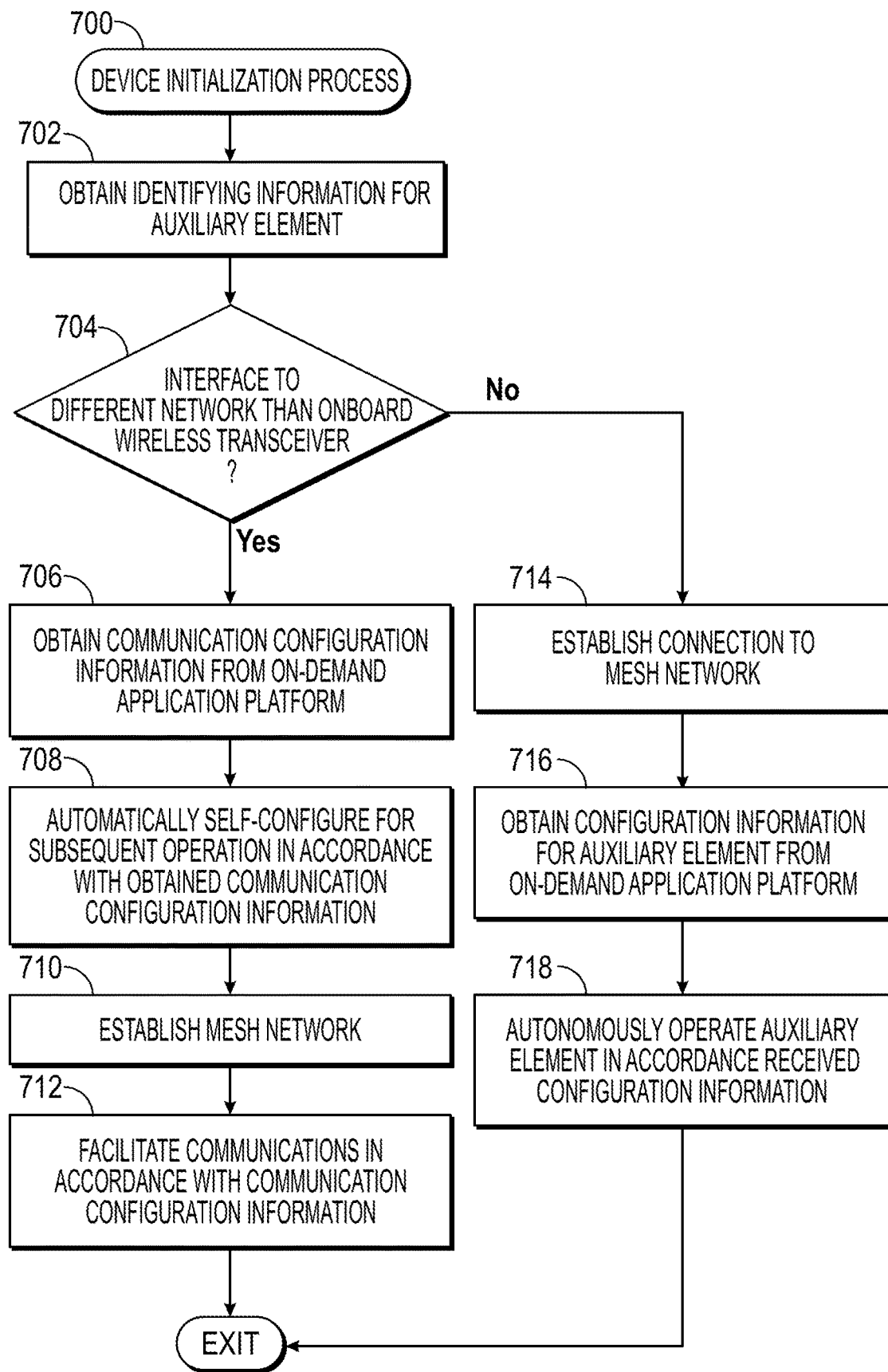
FIG. 7 is a flow diagram of an exemplary device initialization process suitable for implementation by the device of FIG. 6.

FIG. 7 depicts an exemplary embodiment of a device initialization process 700 suitable for implementation by a device 600 in a monitoring system, such as one or more of devices 120, 122, 124, 126 in the monitoring system 112, to self-configure the device 600 for autonomous operation in accordance with the monitoring rules for a site. The various tasks performed in connection with the illustrated process 700 may be performed by hardware, firmware, software executed by a processing system, or any combination thereof. For illustrative purposes, the following description may refer to elements mentioned above in connection with FIGS. 1-6. In practice, portions of the device initialization process 700 may be performed by different elements of the device 600, such as, for example, the control module 604, the wireless transceiver 606, the auxiliary element 612 and/or the GPS receiver 620. It should be appreciated that the device initialization process 700 may include any number of additional or alternative tasks, the tasks need not be performed in the illustrated order and/or the tasks may be performed concurrently, and/or the device initialization process 700 may be incorporated into a more comprehensive procedure or process having additional functionality not described in detail herein. Moreover, one or more of the tasks shown and described in the context of FIG. 7 could be omitted from a practical embodiment of the device initialization process 700 as long as the intended overall functionality remains intact.

In an exemplary embodiment, the device initialization process 700 is performed by a device 600 upon the device 600 being initially powered on, enabled, or otherwise installed at a site. The device initialization process 700 begins by obtaining information identifying a type of auxiliary element associated with the device (task 702). In this regard, when the control module 604 is initially powered on or otherwise enabled, the control module 604 automatically accesses the auxiliary memory 614 onboard the auxiliary substrate 608 to obtain identifying information for the auxiliary element 612 that is stored or otherwise maintained by the auxiliary memory 614. After obtaining the identifying information for the auxiliary element from the auxiliary memory, the device initialization process 700 continues by identifying or otherwise determining whether the auxiliary element is an interface for coupling the device 600 to a distinct network or communications medium different than the one supported by the wireless transceiver 606 based on the identifying information (task 704). In this regard, the control module 604 identifies whether the device 600 is capable of communicating over a network other than a wireless mesh network or other short range or personal area network supported by the wireless transceiver 606. For example, the control module 604 may determine the auxiliary element 612 is a network interface for a distinct network different from the wireless mesh network supported by the wireless transceiver 606 when the identifying information corresponds to a known identifier that is associated with Ethernet ports, IEEE 802.11 transceivers, cellular transceivers, or the like.

In exemplary embodiments, when the auxiliary element is a network interface to a network different than the network associated with the wireless transceiver 606, a respective device 600 automatically identifies itself as a hub device and automatically configures itself for subsequent operation in accordance with a site management process, such as the site management process 200 of FIG. 2. In this regard, in response to determining the auxiliary element is a network interface, the device initialization process 700 continues by establishing communications with the on-demand application platform via the network interface to receive or otherwise obtain configuration information for subsequently communicating with the on-demand application platform via the network and automatically configuring itself for subsequent operation in accordance with the received communication configuration information (tasks 706, 708). For example, using a known location (e.g., an IP address, a URL, or the like) for the application platform 104 and/or the application server 102 on the network 110, the control module 604 may automatically attempt to contact the application platform 104 over the network 110 via the auxiliary element 612 by transmitting a request for communication configuration information to the application platform 104. As described above, in response to receiving the request for communication configuration information, the application platform 104 determines or otherwise identifies the tenant and/or site that the hub device is associated with, for example, by matching the positional information for the hub device accompanying the request to a location of a site associated with the tenant. In this regard, the control module 604 may obtain its physical position from the GPS receiver 620 and transmit or otherwise provide its physical position with the request for communication configuration information, or alternatively, the application platform 104 may identify the hub device 120 as being at the site 114 based on the network location of the hub device 120 on the network 110 (e.g., by identifying the source IP address associated with the request as being within the range of IP addresses on the network 110 associated with the site 114). After identifying the site 114 and/or tenant the hub device 120 is to be associated with, the application platform 104 obtains one or more monitoring rules for the site 114 and/or tenant from the database 108, determines communication configuration information for the hub device 120 (e.g., a frequency or rate at which batched environmental measurement data should be provided to the application platform 104) based at least in part on the monitoring rules, and transmits the communication configuration information to the hub device 120 via the network 110. In response to receiving the communication configuration information, the control module 604 of the hub device 120 automatically configures itself to subsequently communicate with the application platform 104 in the indicated manner. For example, the control module 604 may automatically configure itself to store, buffer or otherwise batch an indicated amount of environmental measurement data and/or to upload or otherwise transmit batched environmental measurement data with the indicated frequency or rate. In this regard, the communication configuration information may include code, software, protocols, commands, or other instructions that are automatically executed by the control module 604 upon receipt of the response that cause the control module 604 to thereafter operate the device 600 in the desired manner.

In exemplary embodiments, for the hub device, the device initialization process 700 continues by creating or otherwise establishing a mesh network for communicating with other sensor devices and/or actuator devices of the monitoring system at the site and subsequently routing or otherwise facilitating communications between the sensor devices and/or actuator devices and the application platform in accordance with the received communication configuration information (tasks 710, 712). In this regard, the control module 604 of the hub device 120 autonomously enables its wireless transceiver 606, sets its address on the wireless mesh network to a particular value, listens for signals from other devices 122, 124, 126 at the site 114 that include that address value in their header, and routes or otherwise transmits communications to/from the devices 122, 124, 126 over the network 110 in accordance with the communication configuration information. As described above, in response to receiving environmental measurement data from one of the sensor devices 122, 124 at the site 114, the hub device 120 may automatically store, buffer, or otherwise batch the environmental measurement data with additional environmental measurement data (either from the same sensor device or a different sensor device) before automatically transmitting the batched environmental measurement data to the application platform 104 via the network 110 with the desired upload frequency. For example, the individual sensor devices 122, 124 may be configured to obtain environmental measurement data at a first frequency or rate (e.g., every 5 minutes) while the communication configuration information indicates that the hub device 120 should upload or otherwise transmit environmental measurement data at a lesser frequency or rate (e.g., every 15 minutes), whereby the hub device 120 automatically batches a number of instances (e.g., 3 instances) of environmental measurement data from the sensor devices 122, 124 before transmitting the batched environmental measurement data to the application platform 104.

Still referring to FIG. 7, in exemplary embodiments, the device initialization process 700 is performed by each device in a monitoring system upon initialization or installation of that respective device. In this regard, when the identifying information for the auxiliary element is not indicative of it being an interface to another network, the respective device automatically joins the wireless mesh network or otherwise establishes a connection to the mesh network created by the hub device at the site (task 714). In this regard, the control module 604 automatically enables the wireless transceiver 606 and establishes communications with the hub device at the site, for example, by transmitting signals that include the address value of the hub device in their respective packet headers. After establishing communications with the hub device at the site, the respective device automatically transmits or otherwise provides a request for configuration information for operating the auxiliary element to the application platform via the hub device (task 716). In this regard, in exemplary embodiments, the control module 604 of a respective sensor device 122, 124 automatically obtains its current position from its GPS receiver 620 and transmits or otherwise provides, to the application platform 104 via the hub device 120, a request for sensor configuration information that includes the current position of the respective sensor device 122, 124 and the identifying information for the auxiliary sensing element 612 associated with the respective sensor device 122, 124. In response to receiving the request, the application platform 104 utilizes the identifying information for the auxiliary sensing element 612 to identify the type of auxiliary sensing element 612 associated with the respective sensor device 122, 124 and obtain, from the database 108, code, protocols, commands, or other instructions for interfacing with the identified auxiliary sensing element 612. Additionally, based on the position of the respective sensor device 122, 124 within the site 114, the monitoring rules for the site 114, and the type of auxiliary sensing element 612, the application platform 104 determines the frequency (or rate) at which environmental measurements should be obtained from the auxiliary element 612. The application platform 104 transmits or otherwise provides a response message to the respective sensor device 122, 124 via the hub device 120 and network 110 that includes the code, software, protocols, commands, or other instructions that enable the control module 604 to operate or otherwise interface with the auxiliary element 612 along with indication of the frequency (or rate) at which the auxiliary element 612 should be operated (or its output sampled).

In exemplary embodiments, the device initialization process 700 continues with the respective sensor device automatically configuring itself so that it subsequently operates the auxiliary element to autonomously obtain environmental measurement data in accordance with the configuration information provided by the on-demand application platform (task 718). In this regard, the control module 604 of a respective sensor device 122, 124 configures itself to autonomously obtain environmental measurement data from the auxiliary element 612 at the sampling frequency indicated by the application platform 104 using the code, protocols, commands, or other instructions provided by the application platform 104, so that thereafter, the control module 604 autonomously operates its associated auxiliary element 612 in accordance with the sensor configuration information received from the on-demand application platform.

In exemplary embodiments, the device initialization process 700 may be performed for each device installed at a site and/or for each auxiliary element coupled to the control module and/or main electronics substrate of a respective device at a site. For example, a given device 600 may include multiple auxiliary substrates 608 that are physically coupled to the primary substrate 602, such that the control module 604 is communicatively coupled to multiple auxiliary elements 612 concurrently. Accordingly, for each respective auxiliary substrate 608 and/or auxiliary element 612, the control module 604 may obtain identifying information from the respective auxiliary memory 614 (e.g., task 702), obtain operating information for the respective auxiliary element 612 from the on-demand application platform 104 (e.g., task 716), and automatically configure itself to autonomously operate the respective auxiliary element 612 in accordance with the operating information provided by the application platform 104 (e.g., task 718). In this manner, the devices 120, 122, 124, 126 at the site 114 operate in conjunction with the application platform 104 to self-configure, so that an individual user need not configure or otherwise provision each device 120, 122, 124, 126 with the necessary software and/or other programming required to operate the respective device 120, 122, 124, 126 in accordance with the monitoring rules for the site 114 established by the tenant.

FIG. 8 depicts an exemplary embodiment of a multi-tenant system 800 suitable for use as the multi-tenant system 105 in the on-demand energy management system 100 of FIG. 1. The illustrated multi-tenant system 800 of FIG. 8 includes a server 802 (e.g., application server 102) that dynamically creates and supports virtual applications 828 (e.g., virtual application 106) based upon data 832 from a common database 830 (e.g., database 108) that is shared between multiple tenants, alternatively referred to herein as a multi-tenant database. Data and services generated by the virtual applications 828 are provided via a network 845 (e.g., network 110) to any number of client devices 840 (e.g., application server 102, client device 116, or the like), as desired. Each virtual application 828 is suitably generated at run-time (or on-demand) using a common application platform 810 (e.g., application platform 104) that securely provides access to the data 832 in the database 830 for each of the various tenants subscribing to the multi-tenant system 800. In accordance with one non-limiting example, the multi-tenant system 800 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 830. In this regard, each tenant includes one or more users associated with, assigned to, or otherwise belonging to that respective tenant. To put it another way, each respective user within the multi-tenant system 800 is associated with, assigned to, or otherwise belongs to a particular tenant of the plurality of tenants supported by the multi-tenant system 800. Tenants may represent customers, customer departments, business or legal organizations, and/or any other entities that maintain data for particular sets of users within the multi-tenant system 800. For example, the application server 102 may be associated with one tenant supported by the multi-tenant system 800. Although multiple tenants may share access to the server 802 and the database 830, the particular data and services provided from the server 802 to each tenant can be securely isolated from those provided to other tenants. The multi-tenant architecture therefore allows different sets of users to share functionality and hardware resources without necessarily sharing any of the data 832 belonging to or otherwise associated with other tenants.

The multi-tenant database 830 is any sort of repository or other data storage system capable of storing and managing the data 832 associated with any number of tenants. The database 830 may be implemented using any type of conventional database server hardware. In various embodiments, the database 830 shares processing hardware 804 with the server 802. In other embodiments, the database 830 is implemented using separate physical and/or virtual database server hardware that communicates with the server 802 to perform the various functions described herein. In an exemplary embodiment, the database 830 includes a database management system or other equivalent software capable of determining an optimal query plan for retrieving and providing a particular subset of the data 832 to an instance of virtual application 828 in response to a query initiated or otherwise provided by a virtual application 828. The multi-tenant database 830 may alternatively be referred to herein as an on-demand database, in that the multi-tenant database 830 provides (or is available to provide) data at run-time to on-demand virtual applications 828 generated by the application platform 810.

In practice, the data 832 may be organized and formatted in any manner to support the application platform 810. In various embodiments, the data 832 is suitably organized into a relatively small number of large data tables to maintain a semi-amorphous "heap"-type format. The data 832 can then be organized as needed for a particular virtual application 828. In various embodiments, conventional data relationships are established using any number of pivot tables 834 that establish indexing, uniqueness, relationships between entities, and/or other aspects of conventional database organization as desired. Further data manipulation and report formatting is generally performed at run-time using a variety of metadata constructs. Metadata within a universal data directory (UDD) 836, for example, can be used to describe any number of forms, reports, workflows, user access privileges, business logic and other constructs that are common to multiple tenants. Tenant-specific formatting, functions and other constructs may be maintained as tenant-specific metadata 838 for each tenant, as desired. Rather than forcing the data 832 into an inflexible global structure that is common to all tenants and applications, the database 830 is organized to be relatively amorphous, with the pivot tables 834 and the metadata 838 providing additional structure on an as-needed basis. To that end, the application platform 810 suitably uses the pivot tables 834 and/or the metadata 838 to generate "virtual" components of the virtual applications 828 to logically obtain, process, and present the relatively amorphous data 832 from the database 830.

The server 802 is implemented using one or more actual and/or virtual computing systems that collectively provide the dynamic application platform 810 for generating the virtual applications 828. For example, the server 802 may be implemented using a cluster of actual and/or virtual servers operating in conjunction with each other, typically in association with conventional network communications, cluster management, load balancing and other features as appropriate. The server 802 operates with any sort of conventional processing hardware 804, such as a processor 805, memory 806, input/output features 807 and the like. The input/output features 807 generally represent the interface(s) to networks (e.g., to the network 845, or any other local area, wide area or other network), mass storage, display devices, data entry devices and/or the like. The processor 805 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 806 represents any non-transitory short or long term storage or other computer-readable media capable of storing programming instructions for execution on the processor 805, including any sort of random access memory (RAM), read only memory (ROM), flash memory, magnetic or optical mass storage, and/or the like. The computer-executable programming instructions, when read and executed by the server 802 and/or processor 805, cause the server 802 and/or processor 805 to create, generate, or otherwise facilitate the application platform 810 and/or virtual applications 828 and perform one or more additional tasks, operations, functions, and/or processes described herein. It should be noted that the memory 806 represents one suitable implementation of such computer-readable media, and alternatively or additionally, the server 802 could receive and cooperate with external computer-readable media that is realized as a portable or mobile component or application platform, e.g., a portable hard drive, a USB flash drive, an optical disc, or the like.

The application platform 810 is any sort of software application or other data processing engine that generates the virtual applications 828 that provide data and/or services to the client devices 840. In a typical embodiment, the application platform 810 gains access to processing resources, communications interfaces and other features of the processing hardware 804 using any sort of conventional or proprietary operating system 808. The virtual applications 828 are typically generated at run-time in response to input received from the client devices 840. For the illustrated embodiment, the application platform 810 includes a bulk data processing engine 812, a query generator 814, a search engine 816 that provides text indexing and other search functionality, and a runtime application generator 820. Each of these features may be implemented as a separate process or other module, and many equivalent embodiments could include different and/or additional features, components or other modules as desired.

The runtime application generator 820 dynamically builds and executes the virtual applications 828 in response to specific requests received from the client devices 840. The virtual applications 828 are typically constructed in accordance with the tenant-specific metadata 838, which describes the particular tables, reports, interfaces and/or other features of the particular application 828. In various embodiments, each virtual application 828 generates dynamic web content that can be served to a browser or other client program 842 associated with its client device 840, as appropriate.

The runtime application generator 820 suitably interacts with the query generator 814 to efficiently obtain multitenant data 832 from the database 830 as needed in response to input queries initiated or otherwise provided by users of the client devices 840. In a typical embodiment, the query generator 814 considers the identity of the user requesting a particular function (along with the user's associated tenant), and then builds and executes queries to the database 830 using system-wide metadata 836, tenant specific metadata 838, pivot tables 834, and/or any other available resources. The query generator 814 in this example therefore maintains security of the common database 830 by ensuring that queries are consistent with access privileges granted to the user and/or tenant that initiated the request. In this manner, the query generator 814 suitably obtains requested subsets of data 832 accessible to a user and/or tenant from the database 830 as needed to populate the tables, reports or other features of the particular virtual application 828 for that user and/or tenant.

Still referring to FIG. 8, the data processing engine 812 performs bulk processing operations on the data 832 such as uploads or downloads, updates, online transaction processing, and/or the like. In many embodiments, less urgent bulk processing of the data 832 can be scheduled to occur as processing resources become available, thereby giving priority to more urgent data processing by the query generator 814, the search engine 816, the virtual applications 828, etc.

In exemplary embodiments, the application platform 810 is utilized to create and/or generate data-driven virtual applications 828 for the tenants that they support. Such virtual applications 828 may make use of interface features such as custom (or tenant-specific) screens 824, standard (or universal) screens 822 or the like. Any number of custom and/or standard objects 826 may also be available for integration into tenant-developed virtual applications 828.

As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. The data 832 associated with each virtual application 828 is provided to the database 830, as appropriate, and stored until it is requested or is otherwise needed, along with the metadata 838 that describes the particular features (e.g., reports, tables, functions, objects, fields, formulas, code, etc.) of that particular virtual application 828. For example, a virtual application 828 may include a number of objects 826 accessible to a tenant, wherein for each object 826 accessible to the tenant, information pertaining to its object type along with values for various fields associated with that respective object type are maintained as metadata 838 in the database 830. In this regard, the object type defines the structure (e.g., the formatting, functions and other constructs) of each respective object 826 and the various fields associated therewith.

Still referring to FIG. 8, the data and services provided by the server 802 can be retrieved using any sort of personal computer, mobile telephone, tablet or other network-enabled client device 840 on the network 845. In an exemplary embodiment, the client device 840 includes a display device, such as a monitor, screen, or another conventional electronic display capable of graphically presenting data and/or information retrieved from the multi-tenant database 830. Typically, the user operates a conventional browser application or other client program 842 executed by the client device 840 to contact the server 802 via the network 845 using a networking protocol, such as the hypertext transport protocol (HTTP) or the like. The user typically authenticates his or her identity to the server 802 to obtain a session identifier ("SessionID") that identifies the user in subsequent communications with the server 802. When the identified user requests access to a virtual application 828, the runtime application generator 820 suitably creates the application at run time based upon the metadata 838, as appropriate. As noted above, the virtual application 828 may contain Java, ActiveX, or other content that can be presented using conventional client software running on the client device 840; other embodiments may simply provide dynamic web or other content that can be presented and viewed by the user, as desired.

Referring again to FIGS. 1-8, one advantage of the subject matter described herein is that environmental conditions at a site and the corresponding energy usage associated with that site may be monitored and regulated in an autonomous manner at or near real-time without requiring manual interaction. For example, a user associated with a tenant need not continuously monitor environmental conditions at the site and then manually determine what actions need to be performed to modify environmental conditions and manually control electrical appliances at the site in the corresponding manner. Additionally, machine learning techniques may be utilized to dynamically adapt monitoring rules and/or the corresponding actions to further improve efficiency.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to networking, sensing, monitoring, signaling, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method of managing a condition of an asset associated with a tenant in a cloud-based multi-tenant-enabled system, the cloud-based multi-tenant-enabled system comprising an application platform to provide an instance of a virtual application to a client over a network, the method comprising:
    providing, by an application platform within an instance of a virtual application, one or more graphical user interface elements adapted to allow a user to define measurement criteria to monitor the condition of the asset and trigger an automated action to influence the condition of the asset based on the measurement criteria, wherein the asset comprises a device at a site associated with the tenant;
    monitoring, at the cloud-based multi-tenant-enabled system, data from asset sensors for changes to the condition associated with the measurement criteria;
    determining, by the application platform, the automated action based on the changes associated with the measurement criteria, wherein the application platform provides configuration information to the device at the site to influence the condition of the asset in accordance with the automated action; and
    providing, by the application platform, a graphical user interface including one or more graphical representations of at least one of the data and the automated action to indicate the condition of the asset.

2. The method of claim 1, wherein the graphical user interface includes information about a configuration of the asset.

3. The method of claim 1, wherein the graphical user interface comprises a dashboard including information about a status of the asset.

4. The method of claim 1, wherein the graphical user interface provides a geospatial context of the asset.

5. The method of claim 1, wherein the graphical user interface comprises information about physical and logical relationships of the asset to other assets.

6. The method of claim 1, wherein the graphical user interface comprises information about historical performance of the asset.

7. The method of claim 1, wherein the data comprises environmental measurement data from a sensor of the asset sensors.

8. The method of claim 7, wherein the graphical user interface comprises a graphical representation of the environmental measurement data.

9. The method of claim 8, the environmental measurement data comprising a recently measured value for an environmental condition, wherein the graphical representation of the environmental measurement data comprises a chart or graph depicting previously measured values for the environmental condition relative to the recently measured value.

10. The method of claim 7, further comprising the application platform initiating the automated action to operate the asset in response to determining the automated action should be undertaken.

11. The method of claim 10, wherein the graphical user interface comprises a graphical representation of a state of the asset.

12. The method of claim 10, wherein the asset comprises an electrical appliance at the site associated with the tenant.

13. The method of claim 1, further comprising the application platform initiating the automated action by the asset in response to determining the automated action should be undertaken.

14. The method of claim 13, wherein the graphical user interface comprises a graphical representation of a state of the asset.

15. The method of claim 14, wherein:
    the data comprises environmental measurement data from a sensor of the asset sensors; and
    determining the automated action comprises determining the automated action should be undertaken by comparing the environmental measurement data to the measurement criteria.

16. The method of claim 1, wherein the asset comprises an electrical appliance at the site associated with the tenant.

17. A non-transitory computer-readable medium having computer-executable instructions stored thereon that, when executed by a processing system of a cloud-based multi-tenant-enabled system, cause the processing system to:
    provide, within an instance of a virtual application, one or more graphical user interface elements adapted to allow a user to define measurement criteria to monitor a condition of an asset and trigger an automated action to influence the condition of the asset based on the measurement criteria for the asset associated with a tenant in the cloud-based multi-tenant-enabled system, wherein the asset comprises a device at a site associated with the tenant;
    monitor data from asset sensors for changes to the condition associated with the measurement criteria;
    determine the automated action based on the changes associated with the measurement criteria to provide configuration information to the device at the site to influence the condition of the asset in accordance with the automated action; and
    provide a graphical user interface including one or more graphical representations of at least one of the data and the automated action to indicate the condition of the asset.

18. The computer-readable medium of claim 17, wherein:
    the data comprises environmental measurement data comprising a recently measured value for an environmental condition from a sensor of the asset sensors; and
    the graphical user interface comprises a chart or graph depicting previously measured values for the environmental condition relative to the recently measured value.

19. A multi-tenant cloud-based system comprising:
- a data storage element to maintain an association between an asset associated with a tenant and measurement criteria; and
- a processing system coupled to the data storage element and a network to:
  - provide, by an application platform within an instance of a virtual application provided to a client over the network, one or more graphical user interface elements adapted to allow a user to define the measurement criteria to monitor a condition of the asset and trigger an automated action to influence the condition of the asset based on the measurement criteria, wherein the asset comprises a device at a site associated with the tenant;
  - monitor data from asset sensors for changes to the condition associated with the measurement criteria;
  - determine, by the application platform, the automated action based on the changes associated with the measurement criteria, wherein the application platform provides configuration information to the device at the site to influence the condition of the asset in accordance with the automated action; and
  - provide, by the application platform, a graphical user interface including one or more graphical representations of at least one of the data and the automated action to indicate the condition of the asset.

20. The multi-tenant cloud-based system of claim 19, wherein the data comprises environmental measurement data from a sensor of the asset sensors.

\* \* \* \* \*